US008451684B2

(12) United States Patent
Lee et al.

(10) Patent No.: US 8,451,684 B2
(45) Date of Patent: May 28, 2013

(54) SURFACE WAVE MITIGATION IN SPATIALLY INHOMOGENEOUS MEDIA

(75) Inventors: Sunwoong Lee, Houston, TX (US); Warren S. Ross, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 498 days.

(21) Appl. No.: 12/811,461

(22) PCT Filed: Jan. 26, 2009

(86) PCT No.: PCT/US2009/032016
§ 371 (c)(1),
(2), (4) Date: Jul. 1, 2010

(87) PCT Pub. No.: WO2009/120402
PCT Pub. Date: Oct. 1, 2009

(65) Prior Publication Data
US 2010/0286921 A1  Nov. 11, 2010

Related U.S. Application Data

(60) Provisional application No. 61/072,248, filed on Mar. 28, 2008, provisional application No. 61/072,311, filed on Mar. 28, 2008.

(51) Int. Cl.
*G01V 1/00* (2006.01)

(52) U.S. Cl.
USPC .............................................. 367/38; 702/17

(58) Field of Classification Search
USPC ................... 367/38, 43–46; 118/112; 702/17
See application file for complete search history.

(56) References Cited

U.S. PATENT DOCUMENTS

| 5,010,976 A | 4/1991 | Airhart |
| 5,035,144 A | 7/1991 | Ausel |
| 5,060,203 A | 10/1991 | Winterstein |
| 5,148,407 A | 9/1992 | Haldorsen et al. |
| 5,241,514 A | 8/1993 | Ehlers |
| 5,278,805 A | 1/1994 | Kimball |
| 5,781,503 A | 7/1998 | Kim |
| 5,971,095 A | 10/1999 | Ozbek |
| 6,026,057 A | 2/2000 | Byun et al. |
| 6,253,870 B1 | 7/2001 | Tokimatsu et al. |

(Continued)

FOREIGN PATENT DOCUMENTS

| EP | 1 596 224 | 10/2007 |
| GB | 2 352 293 | 5/2003 |
| JP | 11287865 | 10/1999 |

OTHER PUBLICATIONS

Berkhout, A.J. (1997), "Pushing the limits of seismic imaging, Part II: Integration of prestack migration, velocity estimation, and AVO analysis", *Geophysics*, pp. 954-969.

(Continued)

*Primary Examiner* — Isam Alsomiri
*Assistant Examiner* — Krystine Breier
(74) *Attorney, Agent, or Firm* — ExxonMobil Upstream Research Company Law Dept.

(57) ABSTRACT

Embodiments are directed to systems and methods (200, 300) that enable spatial variability of surface waves to be accounted for in dispersion correction in seismic data processing. This yields superior surface wave noise mitigation, with reduced likelihood of attenuating signal. Embodiments are operative with spatially inhomogeneous media.

25 Claims, 17 Drawing Sheets

U.S. PATENT DOCUMENTS

| | | |
|---|---|---|
| 6,266,620 B1 | 7/2001 | Baeten et al. |
| 6,446,008 B1 | 9/2002 | Ozbek |
| 6,519,205 B1 | 2/2003 | Baeten et al. |
| 6,612,398 B1 | 9/2003 | Tokimatsu et al. |
| 6,651,007 B2 | 11/2003 | Ozbek |
| 6,665,617 B2 | 12/2003 | Shobayashi |
| 6,691,039 B1 | 2/2004 | Wood |
| 6,721,662 B2 | 4/2004 | Wood |
| 6,735,528 B2 | 5/2004 | Wood et al. |
| 6,834,236 B2 | 12/2004 | Iranpour |
| 6,836,448 B2 | 12/2004 | Robertsson et al. |
| 6,903,999 B2 | 6/2005 | Curtis et al. |
| 6,961,283 B2 | 11/2005 | Kappius et al. |
| 6,987,706 B2 | 1/2006 | Wood |
| 7,239,578 B2 | 7/2007 | Robinson |
| 7,330,799 B2 | 2/2008 | Lefebvre et al. |
| 7,366,054 B1 | 4/2008 | Wood |
| 7,379,386 B2 | 5/2008 | Muyzert et al. |
| 7,382,682 B2 | 6/2008 | Zerouk |
| 7,382,684 B2 | 6/2008 | Love et al. |
| 7,397,728 B2 | 7/2008 | Moore |
| 7,408,836 B2 | 8/2008 | Muyzert et al. |
| 7,466,625 B2 | 12/2008 | Robertsson et al. |
| 7,502,690 B2 | 3/2009 | Thomsen et al. |
| 7,523,003 B2 | 4/2009 | Robertsson et al. |
| 7,564,740 B2 | 7/2009 | Wood |
| 7,584,057 B2 | 9/2009 | Ozbek et al. |
| 7,599,251 B2 | 10/2009 | Love et al. |
| 2005/0024990 A1 | 2/2005 | Laake |
| 2005/0152220 A1 | 7/2005 | Kritski et al. |
| 2007/0043458 A1 | 2/2007 | Pinnegar |
| 2009/0005999 A1 | 1/2009 | Wood et al. |
| 2009/0276159 A1* | 11/2009 | Strobbia .......................... 702/17 |

OTHER PUBLICATIONS

Berkhout, A.J. et al. (2006), "Focal transformation, an imaging concept for signal restoration and noise removal", *Geophysics* 71(6), pp. A55-A59.

Capon, J. (1969), "High-Resolution Frequency-Wavenumber Spectrum Analysis", *Proceedings of the IEEE* 57(8), pp. 1408-1418.

Fink, M. et al. (2001), "Acoustic time-reversal mirrors", *Inverse Problems* 17, pp. R1-R38.

Nazarian, S. (1984), "In situ determination of elastic moduli of soil deposits and pavement systems by spectral-analysis-surface-waves method", PhD thesis, Chap. 7.2, pp. 163-181, The University of Texas at Austin, Austin, Texas.

Park, C.B. et al. (2007), "Multichannel Analysis of Surface Waves (MASW)" and "Multichannel analysis of surface waves (MASW), active and passive methods", *The Leading Edge* 26(1), pp. 60-64.

Snieder, R. (1986), "3-D linearized scattering of surface waves and a formalism for surface wave holography", *Geophys. J R. astr. Soc.* 84, pp. 581-605.

Stevens, J.L. et al. (2001), "Optimization of surface wave identification and measurement", *Pure Appl. Geophs.* 158, pp. 1547-1582.

Yilmaz, O. (1987), "Seismic Data Processing", *Society of Exploration Geophysicists*, Chap. 3.2, pp. 157-166.

*International Search Report & Written Opinion*, dated Mar. 27, 2009, PCT/US2009/032016.

\* cited by examiner

United States Patent US 8,451,684 B2

SURFACE WAVE MITIGATION IN SPATIALLY INHOMOGENEOUS MEDIA

CROSS-REFERENCE TO RELATED APPLICATIONS

This application is the National Stage of International Application No. PCT/US2009/032016, that published as WO 2009/120402, filed 26 Jan. 2009, which claims the benefit of U. S. Provisional Application No. 61/072,248, filed 28 Mar. 2008 and U.S. Provisional Application No. 61/072,311, filed 28 Mar. 2008, each of which is incorporated herein by reference, in its entirety, for all purposes. This application is related to International Application No. PCT/US2009/032013, which published as WO 2009/120401.

TECHNICAL FIELD

This application relates in general to processing seismic data and in specific to characterizing spatial variability of surface waves and then mitigating surface waves in spatially inhomogeneous media.

BACKGROUND OF THE INVENTION

In seismic survey data, surface waves typically dominate intended reflection signals or body wave signals from the subsurface. Thus, it is desirable to attenuate them or remove them for further seismic processing. Current mitigation techniques typically assume the properties of the medium that transmits the surface waves are spatially homogeneous, often resulting in less than optimal surface wave mitigation and/or unwanted attenuation of reflection signals.

FIG. 1 depicts a typical process 100 to mitigate surface waves. Various existing filtering techniques may be used in the process 100. The process starts with one or more seismic records 101 for a particular region of interest. In block 102, the records 101 are analyzed at very few locations. The analysis involves determining the velocities and dispersion curves at the very few, selected locations. The data resulting from block 102 are sparsely sampled surface-wave properties 103. With this data 103, the process then designs filtering criteria to separate surface waves from body waves in block 104. The resulting sparse filtering criteria 105 are then interpolated by the process in block 106 for every location in the record and for every record in the input data 101. The interpolated criteria 107 are next used in block 108 by the process for the mitigation of surface waves in the input data 101 to produce data 109 with mitigated surface waves. Note that in other processes, the surface-wave properties are interpolated for every record instead of the filtering criteria being interpolated, but they result in the same inexact knowledge of the surface wave properties and/or the filtering criteria to separate surface waves from body waves.

One process that is used to reduce the effects of surface waves is phase-matched filtering, which is a method of removing the dispersion characteristics of the surface waves by flattening the surface waves in a seismic record. Phase matching also compresses the long and ringy surface-wave waveform in the time domain by removing the frequency-dependent velocity structure of the surface wave. This produces a surface wave that is not only flat but compact in the time-space domain of the seismic record. This compression of the surface wave is very advantageous because it allows small windows to be used over the limited frequency range of the surface wave to remove the surface wave. In an improvement to narrow time windows, Kim, U.S. Pat. No. 5,781,503, which is hereby incorporated herein by reference, teaches the use of a spatial low-pass filter on the time-aligned and compressed surface-wave data.

In phase-matched filtering, compression and alignment of surface waves are achieved by phase conjugating the surface waves $G(f)$ in the frequency domain using the estimated phase velocity $\hat{v}_p(f)$. The surface waves are compressed in the time-domain after the phase conjugation, since the temporal elongation of the waveforms due to dispersion is negated. The phase conjugated waveforms are then aligned at $t = t_o$ by a time shift implemented by a linear phase shift in the frequency domain, followed by the inverse Fourier transform. This can be mathematically expressed as $$\hat{g}_c(t,\hat{k}_r) = \int G(f) \exp i[-\hat{k}_r r - 2\pi f(t-t_o)] df, \quad (1)$$

where $\hat{k}_r = 2\pi f / \hat{v}_p(f)$, $r = |r - r_s|$, $r_s$ and $r$ are the locations of the source and the receiver, $\hat{g}_c(t,\hat{k}_r)$ is the waveform phase-conjugated by the phase term $\phi(r,f) = \hat{k}_r r$ and then time shifted to $t = t_o$.

Despite the value of aligning and compressing the surface waves, and the value of the subsequent spatial low-pass filtering, it is still necessary with phase-matched filtering of any kind to perform an analysis of the dispersion curves of the surface waves. These dispersion curves, or frequency-dependent phase velocities, are traditionally analyzed on some representative records from around the survey area. Seismic processors then typically apply one dispersion curve, $\hat{v}_p(f)$ to one group of traces, and another curve to another group of traces. In other words, the horizontal wavenumber $\hat{k}_r$ in Eq. (1) does not change within the group of traces, and thus spatial change of $\hat{k}_r$ within the group of traces cannot be accounted for.

The removal of phase to align a wavefield is practiced in several areas of geophysics. For example, the '503 patent to Kim applies phase removal to the alignment of surface waves and teaches the use of a single dispersion function to phase match all the traces in a seismic record under consideration. In standard seismic processing, a normal moveout (NMO) function is applied to prestack seismic data to align body wave reflections in a seismic record, see O. Yilmaz, Seismic Data Processing, Society of Exploration Geophysicists, 1987, which is hereby incorporated herein by reference. Again, only a single NMO function is applied to each trace in the record to achieve this alignment, though of course this single function results in a different time correction at each trace because it removes the effect of source-receiver offset distance. Use of a single function may be appropriate in common midpoint (CMP) processing when it is proper to ignore structuring and anisotropy, i.e., when the beds are essentially isotropic and horizontal, because the reflection represented on each trace in the CMP record is presumed by the sorting of the data to sample the same subsurface point.

When structural complexity is involved, NMO is no longer suitable, and prestack migration must be applied. In migration, phase matching or alignment of reflections in a record is accomplished by calculating the traveltime to the reflector as a wave propagates through a complex, spatially varying velocity overburden, see Yilmaz, ibid. The traveltime computation involves a path integration over the portions of the subsurface through which the wave travels on its path to the reflector and back to the surface. However, this path integral is a scalar integration assuming one number, e.g. velocity, for each cell, which is a volume element in three dimensional space, or voxel, that describes the subsurface along the wave path. Generalizations for anisotropy exist in which the traveltime is computed from a more general, vector velocity field that incorporates velocity as a function of direction. For anisotropy, the direction of the wave through the voxel is combined with the directional aspects of the velocity field to arrive at traveltime for the wave to the reflector and back to the surface. In all of these cases, a single traveltime is applied to each trace for each wavefield being phase corrected. In the simpler cases, the traveltime is derived from a single function, namely standard surface-wave phase matching and NMO. In the more complex cases, such as migration, the traveltime is derived from a different function for each trace, by path integration.

Another application, in many respects identical to seismic migration, is time-reversed focusing. In this application, acoustic wavefields received by a receiver array are time-reversed and then re-emitted into a medium in order to focus or image individual source points in the medium, for example see M. Fink and C. Prada, "Acoustic time-reversal mirrors," Inverse Problems 17, R1-R38, 2001, which is hereby incorporated herein by reference. Since time reversal is equivalent to reversal of the sign of the phase in the frequency domain, this is equivalent to phase removal in a mathematical sense. In time-reversal, however, waves are physically retransmitted from a receiver array, and phase removal is achieved by the waves propagating through the medium. This is inherently different from the present invention where received wavefields are artificially back-propagated through the medium using knowledge of the spatially-varying velocity field of the medium. Although computational time-reversal techniques exist where physical retransmission of the waves is not required, see for example A. J. Berkhout, "Pushing the limits of seismic imaging, Part II: Integration of prestack migration, velocity estimation, and AVO analysis," 1997, *Geophysics*, 954-969, which is hereby incorporated herein by reference, they are similar to true-amplitude migration. Furthermore, their purpose is directed to imaging.

For surface waves, path integration over the portions of the subsurface through which the wave travels is also known, see for example R. Snieder, "3-D linearized scattering of surface waves and a formalism for surface wave holography," Geophys. J. R. astr. Soc. 84, 581-605, 1986, which is hereby incorporated herein by reference. However, the path integration is mostly used for the forward modeling of surface waves. Furthermore, these forward modeling formulations again incorporate amplitude terms at the source and the receiver locations, trying to account for both amplitude and phase of the surface waves. Even when it is used for phase-matching, for example see Stevens and McLaughlin, "Optimization of surface wave identification and measurement," Pure appl. Geophys. 158, 1547-1582, 2001, which is hereby incorporated herein by reference, it was used to facilitate the detection and identification of weak surface wave events. Note that the goal is better localization of seismic sources in space.

BRIEF SUMMARY OF THE INVENTION

Embodiments of the invention are directed to systems and methods that enable spatial variability of surface waves to be accounted for in dispersion correction in seismic data processing. This yields superior surface wave noise mitigation, with reduced likelihood of attenuating signal. Embodiments of the invention are operative with spatially inhomogeneous media.

One embodiment is a method of processing exploration seismic survey data acquired in an inhomogeneous region, wherein the seismic survey data comprises body waves and surface waves from at least one source and at least one receiver, and the method comprising: receiving seismic survey data from at least one sensor; forming a plurality of local dispersion curves from the survey data; extrapolating the dispersion curves to a boarder frequency band; integrating the extrapolated dispersion curves along a path from the source to the receiver; forming a filter using the path-integration curves; and applying the filter to the seismic data to remove at least a portion of the surface waves from the seismic survey data.

Another embodiment is a method of processing exploration seismic survey data acquired in an inhomogeneous region, wherein the seismic survey data comprises body waves and surface waves, wherein the surface waves travel from a source to a receiver along a path, the seismic survey data comprises data for a plurality of source and receiver pairs, and the method comprising: integrating a local dispersion curve over the path of a source and receiver of a pair to form a phase correction term, wherein the curve is a function of an area location and frequency; and phase matching the surface waves in the seismic data using the phase correction term.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following description taken in conjunction with the accompanying drawings, in which.

DETAILED DESCRIPTION OF THE INVENTION

Figure 1:
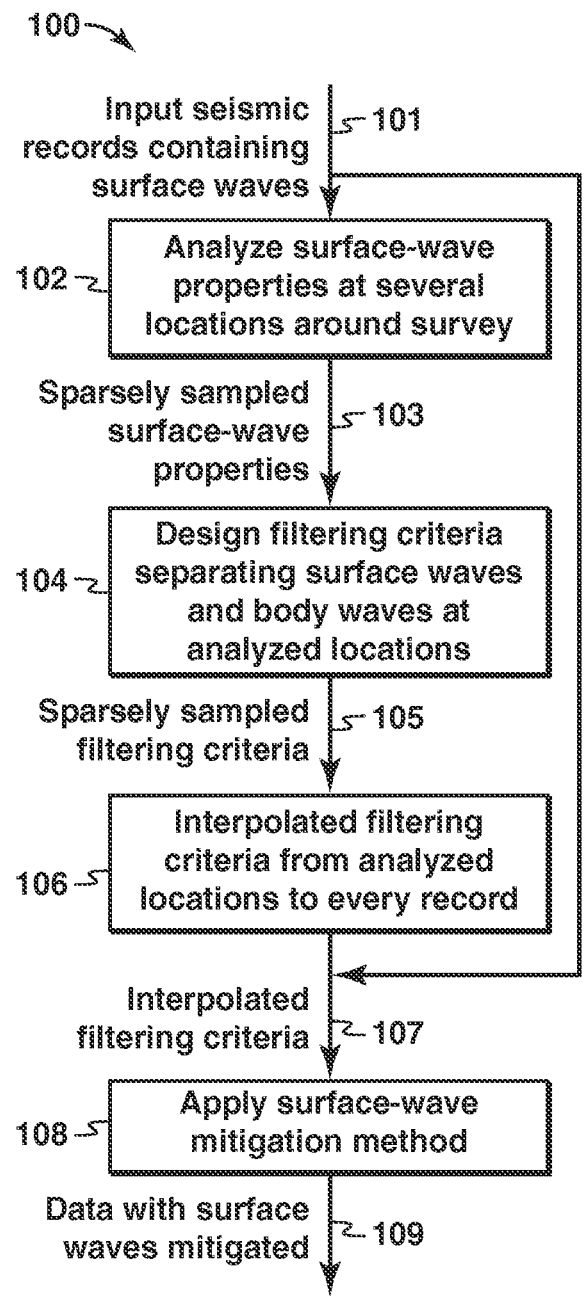
FIG. 1 depicts a prior art process to mitigate surface waves.

Note that there is another limitation on Fourier methods, namely spatial variability of surface wave properties. This problem is observed in the prior art, and yet has not been dealt with. Separating surface waves from body waves requires a decision about the specific threshold for separation, namely at what velocity (or range of velocities) are the surface waves and body waves. Filtering requires setting these thresholds to optimally remove the noise. Deciding on these thresholds is typically performed by analyzing seismic records in the data, perhaps ones from different parts of a seismic survey. No matter how thorough an analysis is attempted, it is too labor intensive to manually identify these velocity thresholds on any but a small subset of the data. Furthermore, it is not apparent how these threshold estimates at different locations can be used for surface-wave mitigation, even if one performed thorough analysis over the entire survey area.

Typically, very little is known about spatial variability of the surface-wave velocities in processing seismic data except to perform some kind of (usually ad hoc) interpolation of the velocities between the available analysis points. Nonetheless, spatial variability exists, and processes attempt to adjust for it by widening their velocity zones for surface waves and body waves, so that each zone includes not only the velocity at any one location but also the anticipated variability. The problem with widening windows is that the ability to distinguish the surface waves and body waves on any one record is reduced because the zones for each are wider. This is an inherent tradeoff between distinguishing and addressing spatial variability when spatial variability is addressed in this ad hoc manner.

Embodiments of the present invention are directed to systems and methods which use seismic processing methods that include estimates for the variability of surface waves for changes in their velocities as a function of 2-D space and frequency. In other words, embodiments incorporate spatial variability of surface-wave velocities into surface wave mitigation. More specifically, embodiments determine (i) how local properties of surface waves can be estimated over the entire seismic survey area, and (ii) how the estimated local properties can be used for surface-wave mitigation by negating the propagation effects of surface waves through spatially varying media. Note that while embodiments are applicable to multi-component data, the embodiments do not require more than one component, since it does not exploit phase relationships (such as polarization attributes) between co-located receivers. Note that multi-component data is seismic data measured by two or more co-located sensors responsive to ground motion in different directions.

Embodiments determine the extent to which the region under study is in fact spatially variable and in need of the benefits of those methods. In other words, embodiments rapidly characterize or estimate the variation in surface-wave velocity for a region. The output of the characterization is useful in determining whether the full surface-wave mitigation methods must be employed. Thus, the full surface-wave mitigation method may be unnecessary for some or all portions of the region. Such portions or subdivisions of the survey area or region have surface-wave properties that can be assumed to be approximately constant. This subdivision would allow methods of surface-wave mitigation to be employed in the sub-regions. The output of the rapid characterization would also determine the size of analysis boxes in the estimation of local surface-wave dispersion curves. Embodiments operate to generate a spatial map that quantitatively depicts the variability of surface wave velocities as a function of space.

Note that embodiments recognize that the prior art techniques do not explicitly take into account the fact that the velocities of the surface waves vary when analyzing the properties of surface waves to distinguish them from the deeper reflective body waves. Thus, the prior art approach of FIG. 1 may perform adequately in suppressing surface waves from seismic data when the characteristics of the surface waves do not vary by more than a small percentage (<10%). As the percentage change of the surface wave velocities and/or dispersion characteristics over the survey area becomes larger, all of the prior art methods will suffer from the inexact characterization of that spatial variability, resulting in only approximate removal of surface waves and/or harming the body wave reflections (reducing their strength or modifying their phase and amplitude spectra).

Embodiments also recognize that prior art techniques believe that comprehensive analysis of surface-wave properties is too onerous and/or to error-prone to be performed. Thus, prior art techniques limit their analysis to estimate the properties at a few selected locations. Other techniques attempt to characterize the shallow near-surface by acquiring auxiliary measurements, see for example US Patent Publication 2005/0024990 A1 to Laake, which is hereby incorporated herein by reference, rather than extracting near-surface characterization from the data themselves. Others techniques, for example U.S. Pat. No. 6,266,620 B1 to Baeten et al., which is hereby incorporated herein by reference, even when attempting automated detection of the location of surface waves in a seismic record, only contemplates determining the minimum and maximum surface-wave velocity in a survey. Other techniques, such as US Patent Publication 2005/0143924 A1 to Lefebvre et al., which is hereby incorporated herein by reference, attempt to estimate the entire dispersion curve, but only for a very small spatial scale by narrow bandpass filtering of a very limited amount of data, similar to the geotechnical and local scales typical of well-known methods such as "Spectral Analysis of Surface Waves (SASW)" (Nazarian, S. (1984); "In situ determination of elastic moduli of soil deposits and pavement systems by spectral-analysis-ofsurface-waves method," PhD thesis, The University of Texas at Austin, Austin, Tex.); "Multichannel Analysis of Surface Waves (MASW)" by Choon B. Park, Richard D. Miller, Jianghai Xia, and Julian Ivanov; and "Multichannel analysis of surface waves (MASW); active and passive methods," The Leading Edge (Tulsa, Okla.) (January 2007, 26(1):60-64), the disclosures of which are hereby incorporated by reference. Note that these methods attempt to invert for the near-surface shear velocity, and do not attempt to mitigate surface waves. Also, these methods are specifically designed to analyze the seismic surface waves and not the seismic body waves. Therefore, their spatial sampling rates are higher than those in typical exploration seismic surveys in order to avoid aliasing of surface waves.

Embodiments of the invention operate to estimate the spatially variable velocity along the direct path of surface waves from source to receiver. Once that spatially variable velocity is accurately estimated, analysis and removal of scattered surface waves and/or direct surface waves is possible. The spatially variable velocity analysis yields local surface-wave properties for the survey area, specifically surface-wave phase and group velocities at each spatial location. The analysis at every location in the survey will have correspondence to geological and topographical features of the survey area, as well as having correlation to other related geophysical parameters such as shear-wave statics. Embodiments note that the use of the surface-wave properties and their corresponding filtering criteria should be different for each trace in the record.

Figure 2:
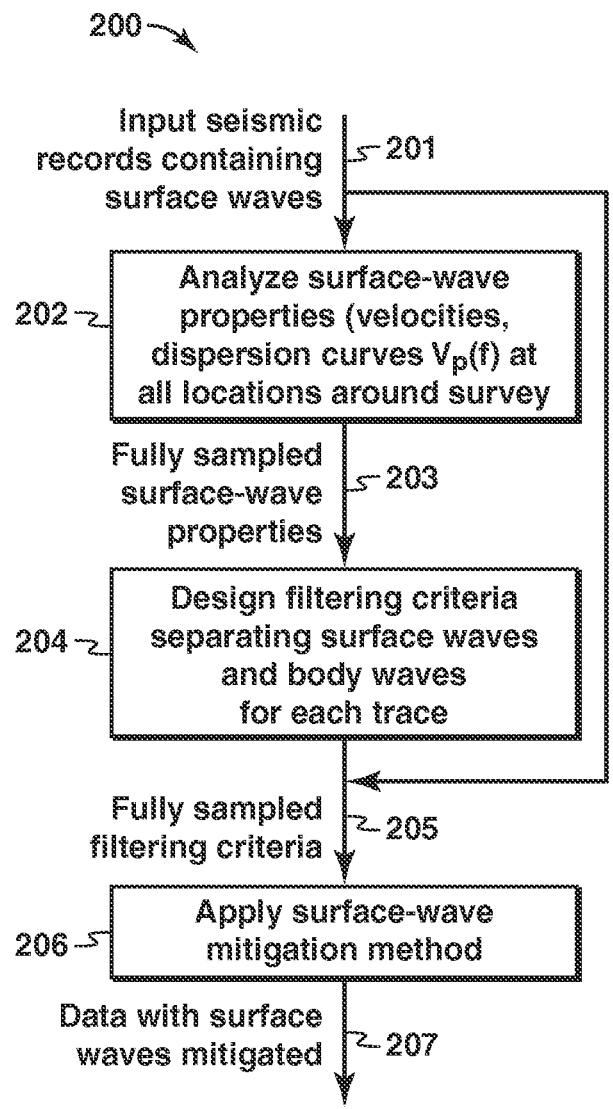
FIG. 2 is a process to mitigate surface waves, according to embodiments of the invention.

FIG. 2 depicts a process 200 to mitigate surface waves according to embodiments of the invention. The process starts with one or more seismic records 201 for a particular basin or region of interest. The seismic record may be created by, for example, firing a shot of dynamite or vibrating the surface of the earth. A plurality of sensors located on or in the surface of the earth record the waves from the shot. In block 202, the records 102 are analyzed at all or substantially all of the locations in the survey area, which creates a data set 203 of fully sampled surface-wave properties in which no interpolation is necessary. The size or granularity of each location may be selected based on the data. For example, the size of each location may be based on the size of the sensor grid used to form the data, with the location size being set to the closest spacing in the sensor grid.

The analysis involves determining the velocities and dispersion curves at the locations. With this data 203, the process then designs filtering criteria to separate surface waves from body waves in block 204. Note that the filtering criteria are correct for each trace in the data set 203. Block 204 results in a set of fully sampled filtering criteria 205. The criteria 205 is then applied to the records 201 in block 206 to mitigate the surface waves in the input records 201 to produce data 209 with mitigated surface waves. Note that the analysis of FIG. 2 is performed at all or substantially all of the locations of the survey, such that every source receiver pair in the entire survey would be analyzed. To obtain such data, typically many sensors are placed at many points within the region, often on a regular grid. If there are missing sensors, the data for these areas may be interpolated, or the analysis may focus on areas with shots, but no sensors.

Figure 3A:
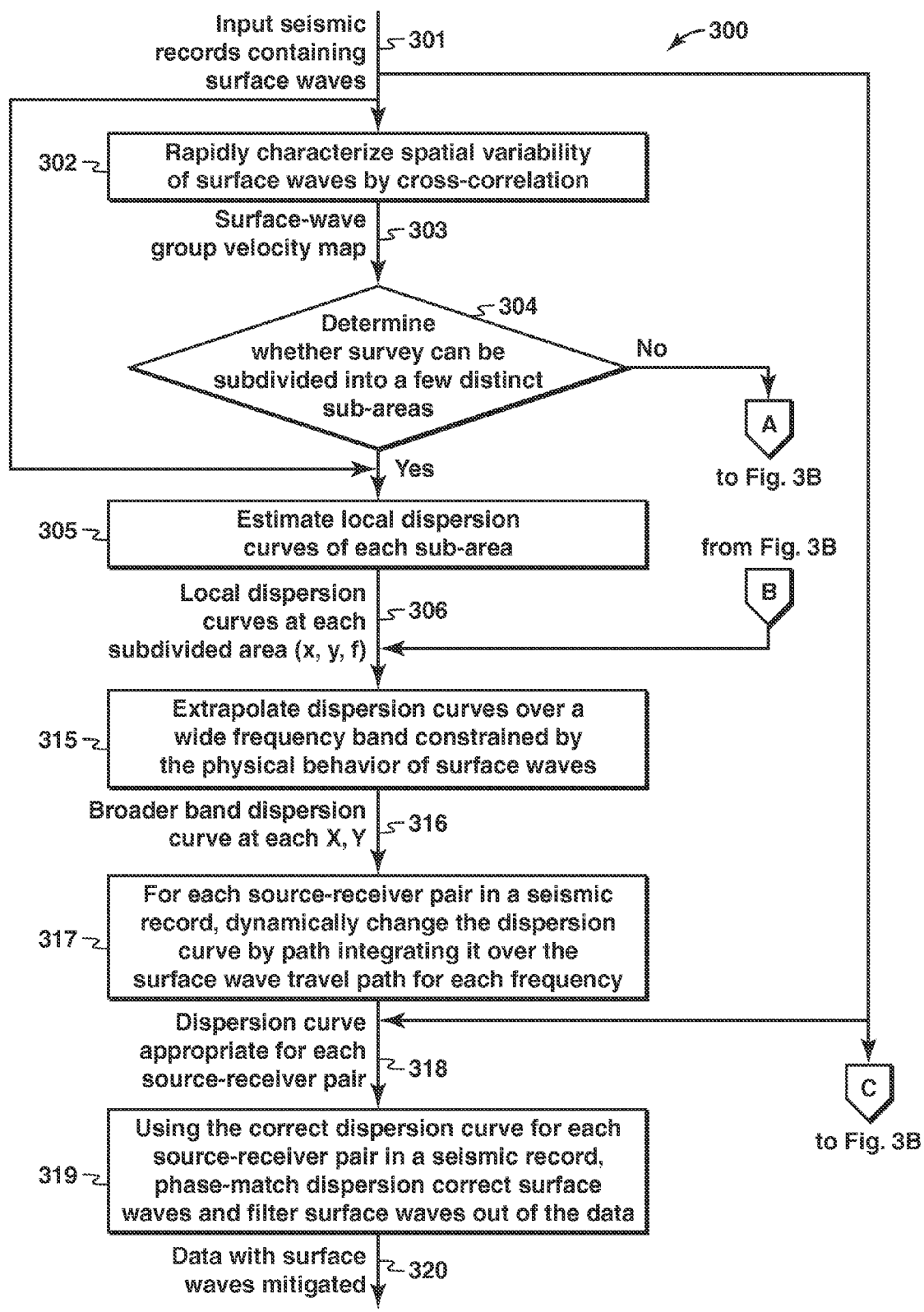
FIGS. 3A and 3B depict another process to mitigate surface waves, according to embodiments of the invention.
Figure 3B:
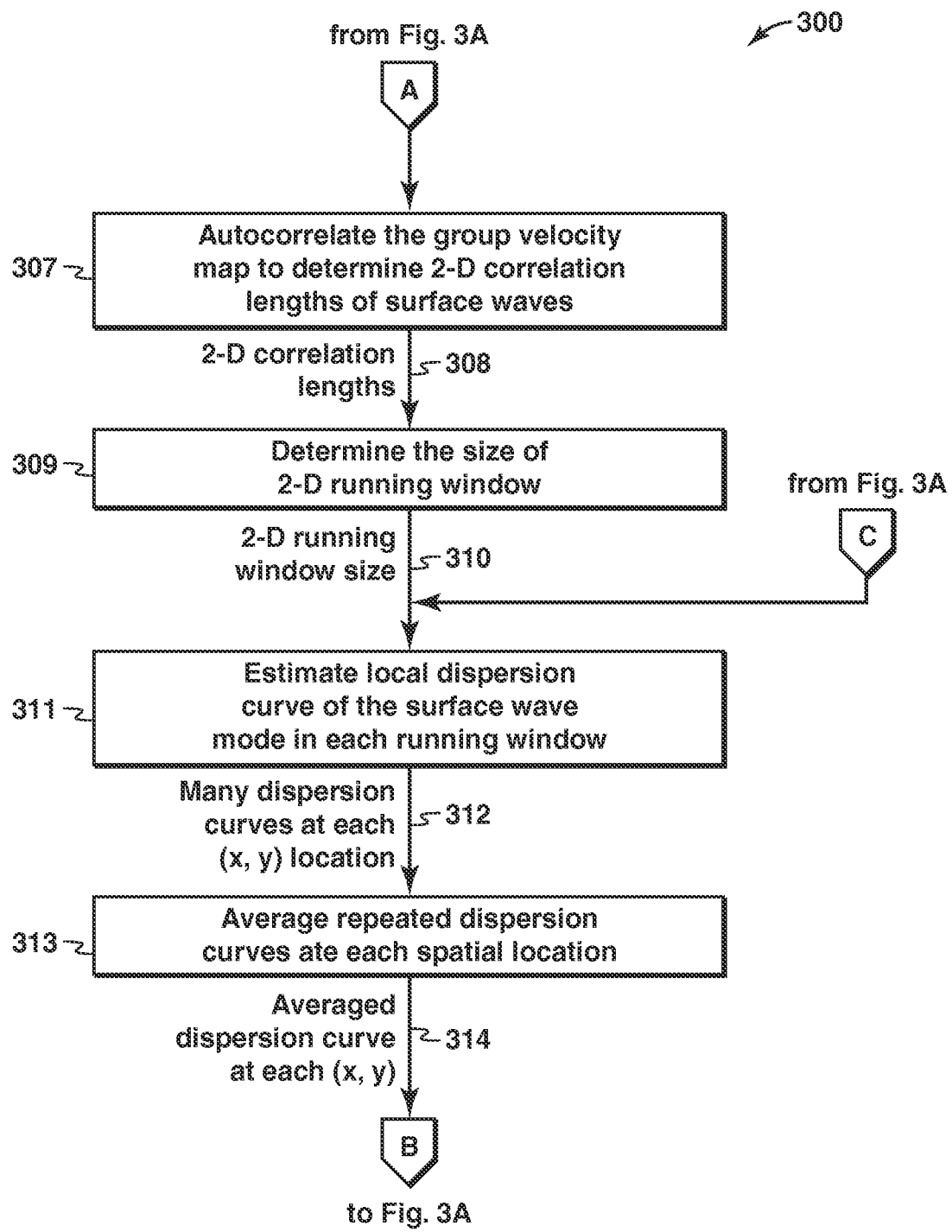
Figure 12:
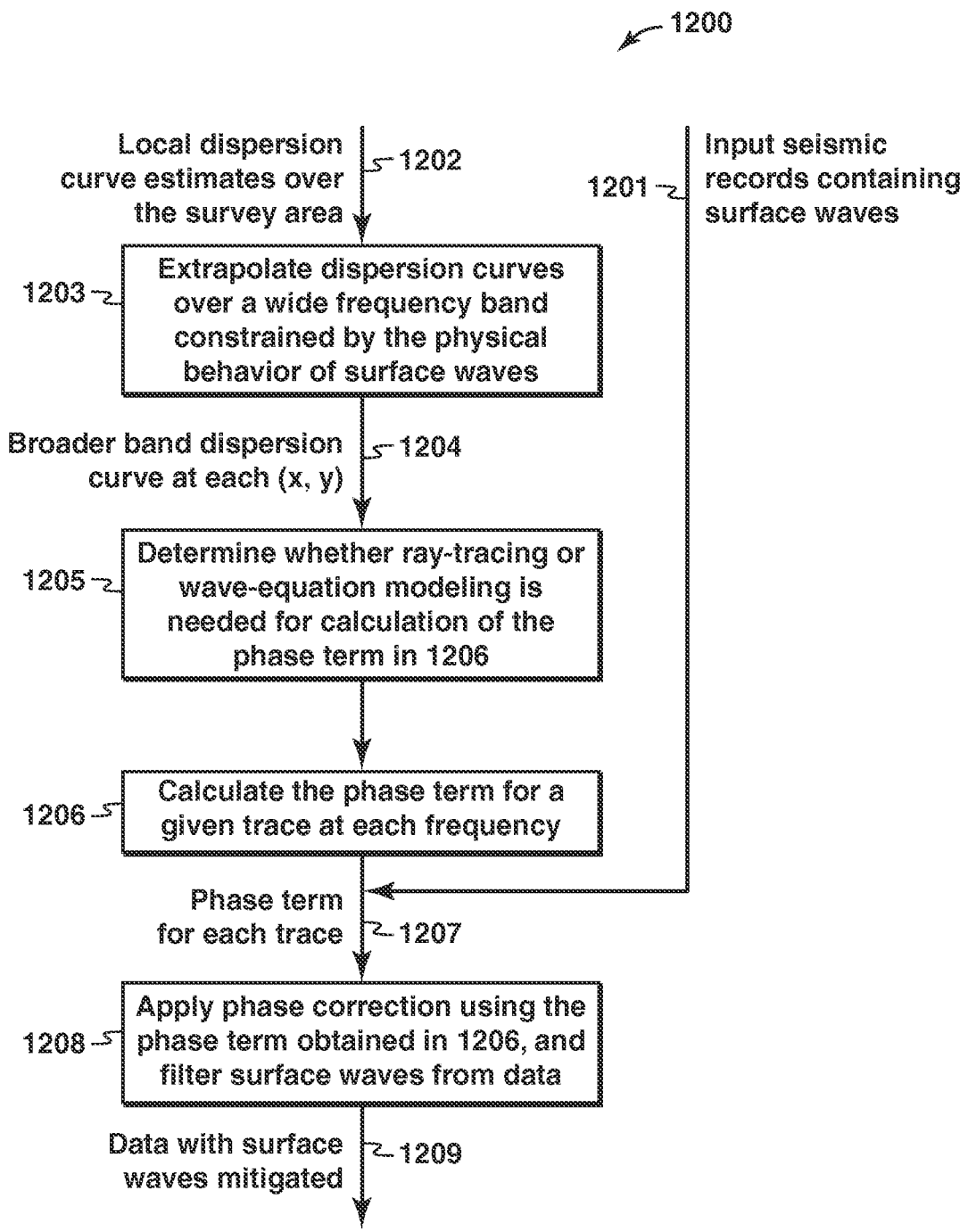
FIG. 12 depicts a process to mitigate surface waves, according to embodiments of the invention.

FIGS. 3A and 3B depict another process 300 to mitigate surface waves according to embodiments of the invention. The process starts with one or more seismic records 301 for a particular region of interest. In block 302, the process characterizes the spatial variability of the surface waves in the records 301 by cross-correlating dominant surface wave modes. This block operates as shown in FIG. 12 of U.S. Provisional Patent Application No. 61/072,248. The output of block 302 is a map 303 of the average group velocity.

Figure 4:
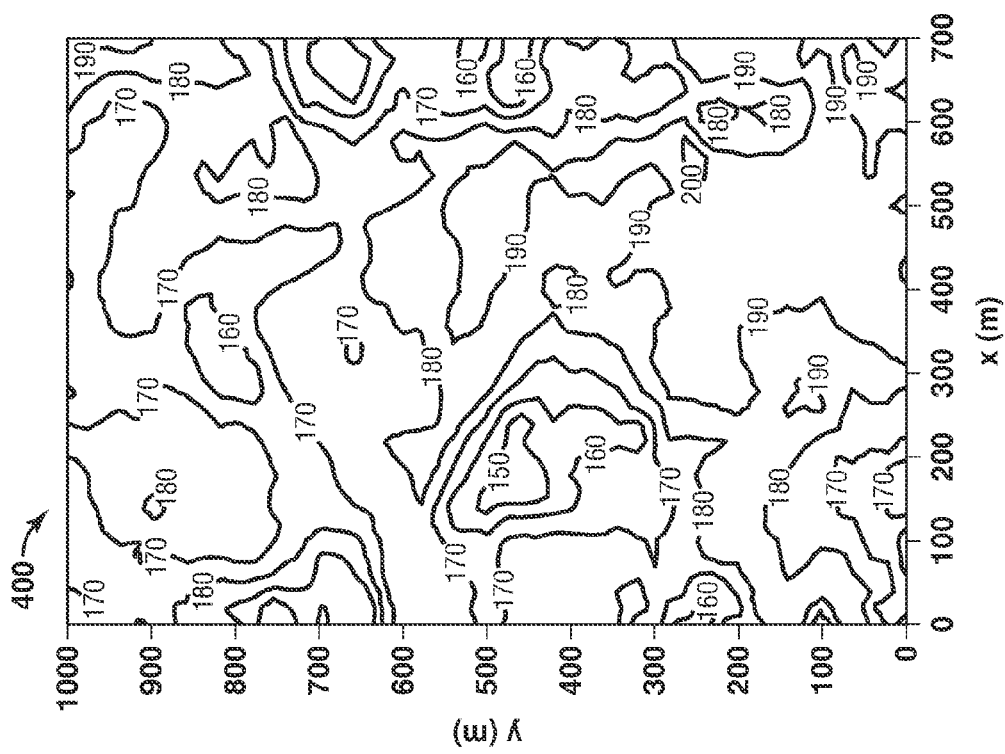
FIG. 4 depicts an example of an average surface-wave group velocity map of the survey area, according to embodiments of the invention.

FIG. 4 depicts an example 400 of an average surface-wave group velocity map of the survey area 303 that would be produced by block 302. Note that FIG. 4 shows that the survey area exhibits a continuous spatial variation of surface wave properties.

The process uses the average group velocity map 303 to determine in block 304 whether the survey area can be sub-divided into one or more sub-areas. Note that in each sub-area the surface wave velocities can be assumed to be relatively constant, e.g. within $\leq 10\%$ variability, depending on the frequency, average speed and other factors. If the determination is affirmative, then the process proceeds to block 305, where the process estimates the local dispersion curve within each sub-area using surface-wave data 301 using the same method for estimating the dispersion curve described below, but in this case only applied once to each subregion. Using sub-areas will save processing time and costs without overly affecting accuracy. The output from block 305 is a collection of local dispersion curves 306 for each subdivided area. The collection of curves is then used in block 315.

If the determination of block 304 is negative, meaning that the survey area cannot be subdivided into a few sub-areas with distinct boundaries, then the process proceeds to block 307, where the process starts a sub-process comprising blocks 307, 309, 311, and 313 to determine the dispersion curve at each spatial (x,y) location in the survey region.

The sub-process begins in block 307 by performing 2-D autocorrelation of the surface-wave group velocity map 303 estimated in block 302 to calculate the correlation lengths of the group velocities in 2-D space. Block 307 produces a set 308 of 2-D correlation lengths. Note that it is assumed these correlation lengths 308 also represent the correlation lengths of surface wave properties in 2-D space, and hence represent a desirable window size for the analysis in block 311. Window sizes larger than these coherence lengths may encounter large spatial variability for the dispersion estimates made in the next step to be considered a local property of the surface waves. Smaller window sizes would increase processing time and costs.

Figure 5:
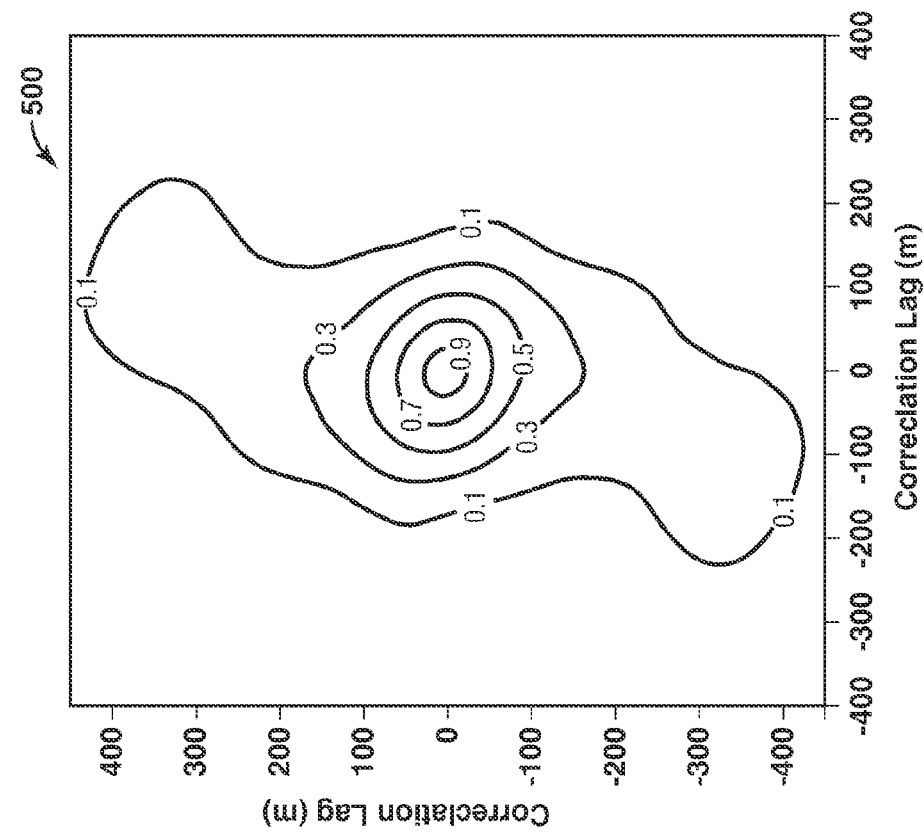
FIG. 5 depicts an autocorrelation of the map of FIG. 4, according to embodiments of the invention.

FIG. 5 depicts the correlation map 500, which is the results 308 of the operation of block 307 to autocorrelate the map 400 of FIG. 4 in 2-D space. Note that map 400 could not be sub-divided because there are no sub-regions where the velocity is constant. Thus, the process begins operations of the sub-process of blocks 307, 309, 311, and 313. From analysis of map 500, the correlation lengths of the surface-wave properties can be found to be 400 meters (m) and 200 m respectively, when 90% correlation threshold is used. Note that the 90% threshold means that the correlation function value drops to 0.1 from its peak value of 1.0.

Using the set 308, the sub-process then proceeds with block 309 that determines the 2-D running window size for local dispersion curve estimation, also referred to as "beam forming." The result is one or more values 310 denoting the window size. The running window size is the size of the 2-D array used for beam forming in block 311. Note that the running window size ideally would be identical to the correlation lengths 308. However, the process may use a running window size that is greater than the correlation lengths if the spatial sampling rate is much lower than the Nyquist sampling rate, or if the beamwidth of the effective array formed by the traces in the running window does not provide sufficient resolution to reliably separate different modes in the beam formed field. In other words, if the window is too small, then there may not be enough survey traces to form an adequate estimate. Thus, increasing the window size is desirable.

The sub-process then operates block 311 that windows the survey area using one or more 2-D running windows having the length as specified by value 310. The seismic data within each window is then used for estimation of local dispersion curves within the windowed area. The results of block 311 are a set 312 of dispersion curves at each (x,y) location. The dispersion curves can be formed by transforming seismic data into the frequency-wavenumber domain or frequency-phase slowness domain, and by detecting the peaks within the frequency band where surface waves are sufficiently energetic. While transforming data into the frequency-wavenumber domain, data from different azimuths are merged along the offset direction, so that the resulting offset sampling can effectively satisfy the Nyquist sampling criterion. The seismic data can be filtered in time or frequency before the transform to increase the signal-to-noise ratio. If common-shot gather data, meaning one shot and many receivers are used for beamforming, the seismic traces of the receivers within the window are used for beamforming. If common-receiver, meaning one receiver and many shots to gather data are used, only the traces of the shots within the window are used. If super-shot gather data, meaning a grouping of the receiver traces from more than one shot together as one larger entity, are used, both the shots and the receivers need to be within the window. Note that block 311 may be operative for each of the different modes or velocities of the surface waves, with a curve being produced for each mode in addition to each location.

Figure 6:
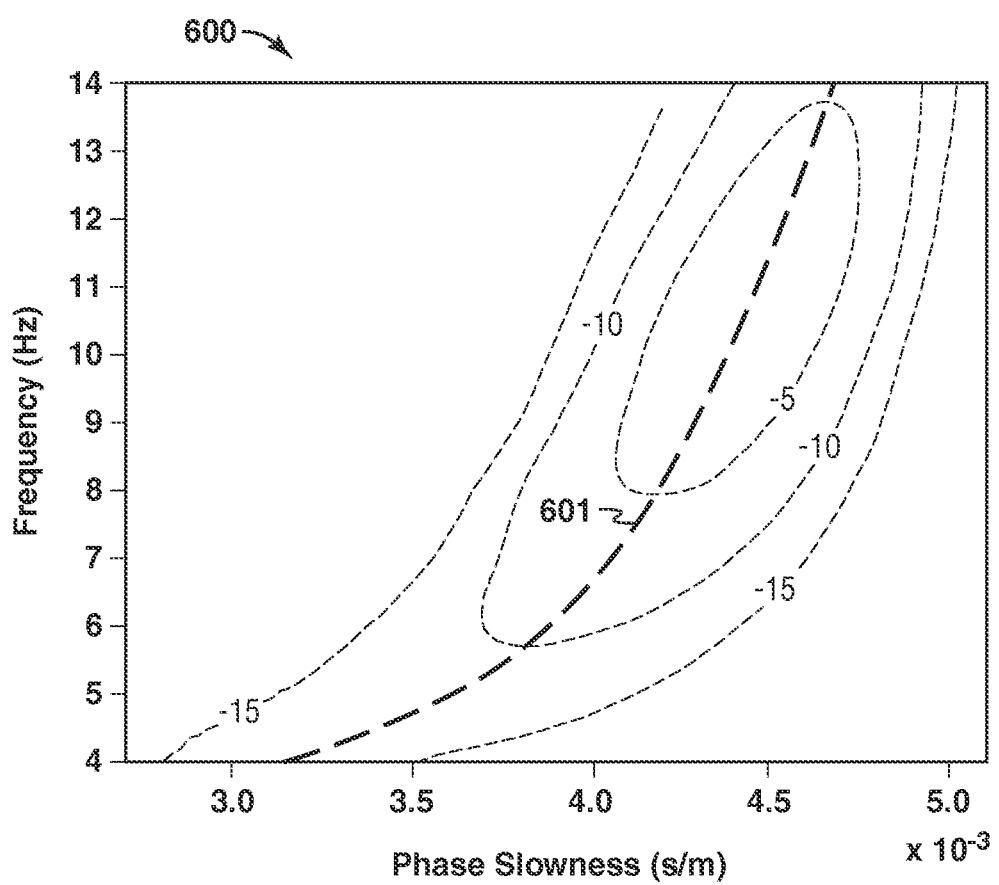
FIG. 6 depicts an example of a beamformed field in the frequency-phase slowness space, according to embodiments of the invention.

Continuing with the example of FIG. 4, from the autocorrelation map 500, the survey area would be subdivided into 400 m by 200 m overlapping running windows, and the dispersion curves of each local or subdivided area are estimated by array steering or beam forming. FIG. 6 depicts an example 600 of a beamformed field in the frequency-phase slowness space, which is derived from analyzing the seismic record (shot or receiver gather) from one 2-D spatial running window, where the dispersion curve 312 can be estimated by automatic peak detection. The line 601 is the peak of the beamformed field at each frequency. Note that curve 601 derived from beamformed field 600 is for spatial locations (x,y) within the 2-D running window such that there would be many curves for the entire survey area, one or more at each (x,y) location, as discussed below.

Block 311 is repeated to form many different gathers, e.g. multiple common-shot, multiple common-receiver, multiple super-shot, and/or various combinations of one or more common-shot, common-receiver, and super-shot gathers to obtain many local dispersion curve estimates 312 over the entire survey area. The running window is moved with sufficient overlap to obtain estimates of the local dispersion curves at different spatial locations. The overlap regions of the sliding window should be determined by the spatial redundancy of the seismic data. When seismic data are rather sparse for an exploration seismic survey, the process operates with a conservative overlap of 75% in each spatial domain and provides sufficiently many dispersion curve estimates for averaging.

The multiple estimates of the dispersion curves 312 is then averaged by the sub-process in block 313 for each spatial location. Block 313 results in a set 314 of averaged dispersion curves at each (x,y) location. This set is then used in block 315. Further processing would flatten that particular mode of the surface waves by removal of the dispersion effect using Eq. (2) described below in preparation for mitigation.

Figure 7B:
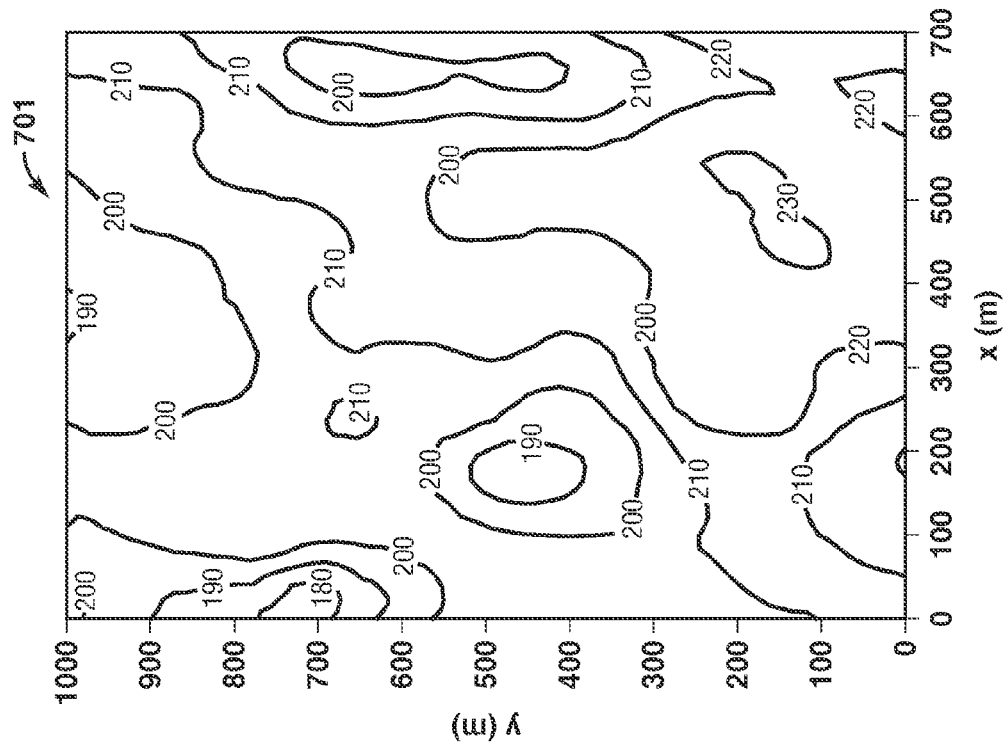
FIGS. 7A and 7B depict examples of the spatially-varying dispersion curves at two different frequencies, according to embodiments of the invention.
Figure 7A:
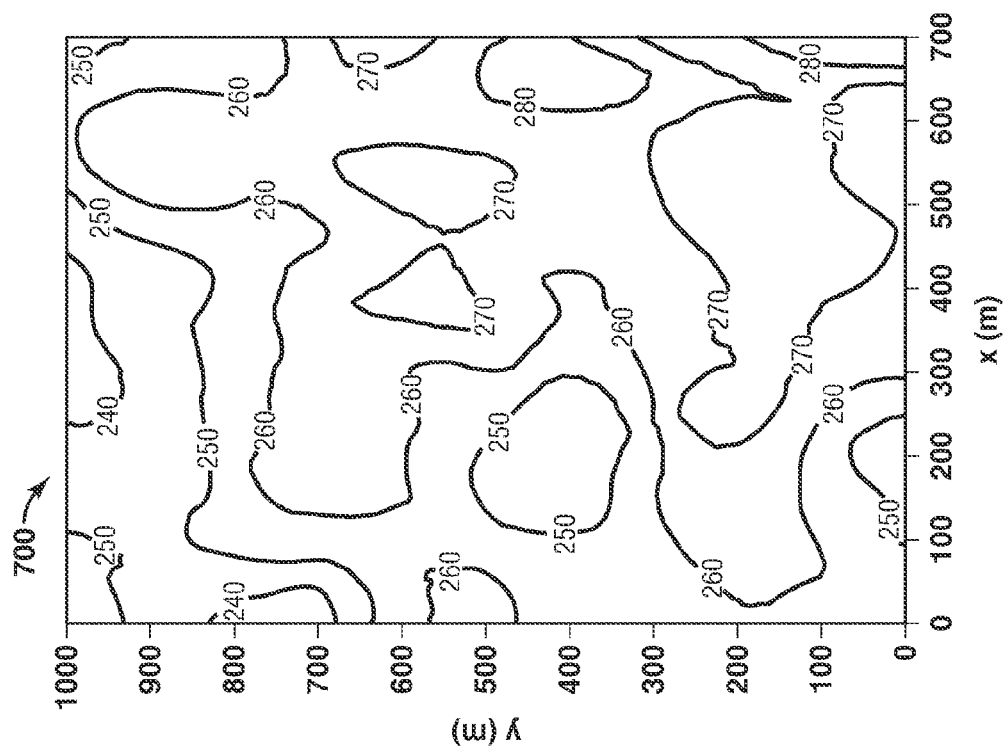

Continuing with the example of FIG. 4, the dispersion curves, e.g. 601, for overlapping running windows are averaged at each spatial location to obtain the spatially-varying dispersion curves over the survey area, creating a full volume of dispersion curves ($v_p$ (x,y,f), i.e. velocity as a function of (x,y) location and frequency f). At each individual frequency, e.g. frequency $f_0$, a map of velocity is obtained, $v_p$ (x,y,$f_0$), such that the dispersion volume can be observed one frequency at a time as a map view, where it is understood that frequency is constant in each map. FIGS. 7A and 7B depict examples 700, 701 of the spatially-varying dispersion curves at two different frequencies, namely map 700 is for 5 hertz (Hz) and map 701 is for 10 Hz. Note that the maps depict the entire area of the survey. Further note that maps 700 and 701 are examples of the output 314 of block 313, and there would be more maps for different frequencies.

The process in block 315 uses either the set of curves 306 for block 305 or the set of curves 314 from block 313. With either data, the block 315 operates to extrapolate the curves over the entire frequency band while following the physical behavior of surface waves. In the low-frequency end, e.g. the dispersion curves are extrapolated so that (i) phase velocity is a monotonically decreasing function of frequency, (ii) group velocity is a monotonically decreasing function of frequency, and (iii) phase velocity equals group velocity when frequency f=0. The low frequency end is the range below what is known in the art as the Airy phase, usually 0-3 Hz for surface waves in exploration seismic data, and the Airy phase is at a frequency corresponding to the minimum of the group velocity curve. In the high-frequency end, e.g. the dispersion curves are extrapolated so that (i) phase velocity is a monotonically decreasing function of frequency, (ii) group velocity is a monotonically increasing function of frequency, and (iii) phase velocity and group velocity asymptotically reach the same value as frequency goes to infinity. The high frequency end is the frequency range above the Airy phase, often 10-25 Hz for surface waves in exploration seismic data. The output of block 315 is a set 316 of broader band local dispersion curves.

The process then proceeds to use the broad band dispersion curves at all (x,y) locations. Conventionally, the curve may be applied at one location (x,y) to calculate the phase term and then apply it to all the traces in the shot gather whose shot is located at the same (x,y) (or the receiver gather whose receiver is located at that (x,y)). However, this could not make full use of the value of having the dispersion curves at all locations, because having them at all locations allows the calculation of a phase term that is different for each trace in the shot record. Alternatively, the process in the present invention may proceed with blocks 317 and 319, which dynamically changes the dispersion curves as a function of both source and receiver positions within the gather (block 317) to produce a set 318 of dispersion curves appropriate for each source-receiver pair. Processing at block 317 involves having each trace in the seismic record having an associated travel time for the different modes of the surface wave at each frequency. Thus, for each source receiver pair, the seismic record dynamically changes the dispersion curve by path integrating over the surface wave travel path for each frequency. Note that this may be viewed as each source receiver pair having its associated velocity as a function of frequency.

The data 318 is used to mitigate surface waves in the input records 301 in block 319. Thus, using the process 300 trace by trace dispersion correction can be performed for each source receiver pair in the seismic record, and thus can be applied to the record to mitigate surface waves. One manner to mitigate the surface waves is this phase matching, which flattens and compresses the surface waves, such that the surface waves can be filtered or windowed out of the data without degrading the signal of the body waves. Other ways of mitigating the surface waves can be used, such as time-reversal backpropagation or focal transformation, as discussed below. The resulting data 320 has less noise from surface waves and thus allows for better analysis and processing of the body waves.

Figure 8:
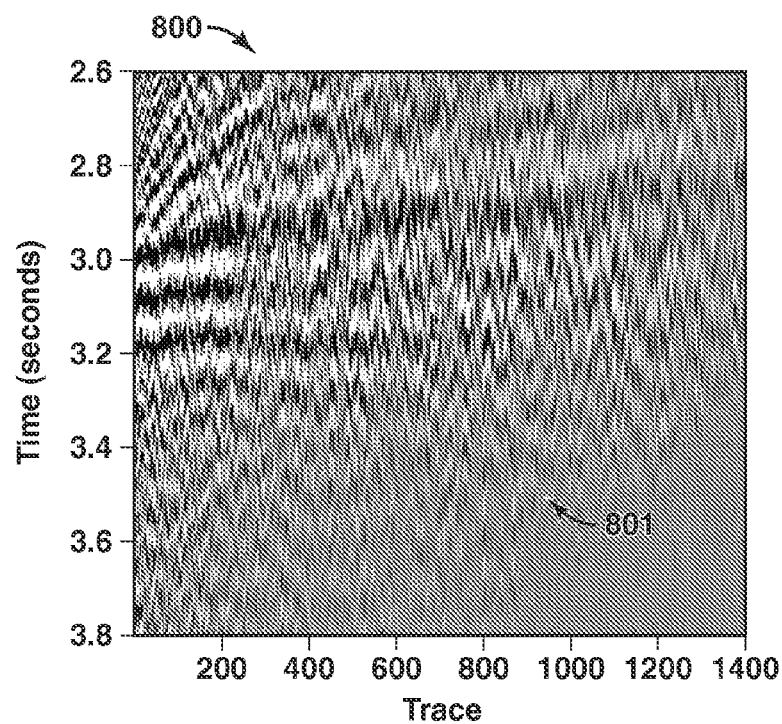
FIG. 8 depicts an example of the seismic data after the output of block 106 of FIG. 1 is used to phase-correct, or flatten, each trace in a seismic record.

FIG. 8 depicts an example 800 of phase matching using the output of block 106 of FIG. 1, namely the interpolated filtering criteria 107. FIG. 8 is derived from the conventional method of FIG. 1 using a single reasonable dispersion curve for the entire record. FIG. 8 depicts dispersion corrections or phase matching for the slowest-velocity surface wave mode in the record. Note region 801 with poor flattening of the surface waves.

Figure 9:
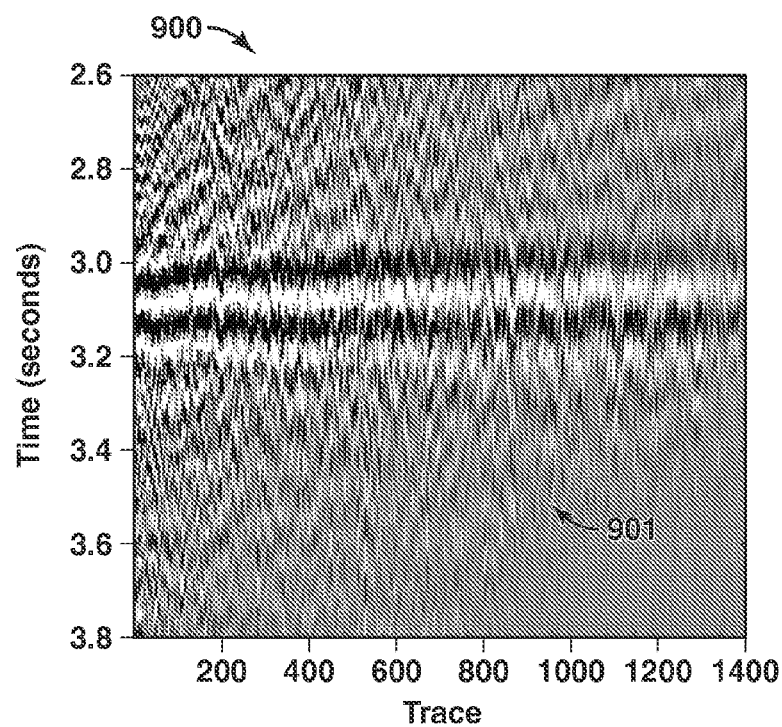
FIG. 9 depicts an example of the seismic data after the output 318 of block 317 of FIG. 3, according to embodiments of the invention, which is used to phase-correct, or flatten, each trace in a seismic record.

FIG. 9 depicts an example 900 of phase matching using the output 318 of block 317. FIG. 9 shows dispersion corrections or phase matching for the slowest-velocity surface-wave mode in the record. FIG. 9 is derived using unique dispersion correction that is estimated and applied for each trace in the record. Note that the curve 900 exhibits better flatness and a tighter more continuous wavelet trace-to-trace, e.g. region 901, than does the surface wave in the record of FIG. 8.

Figure 10:
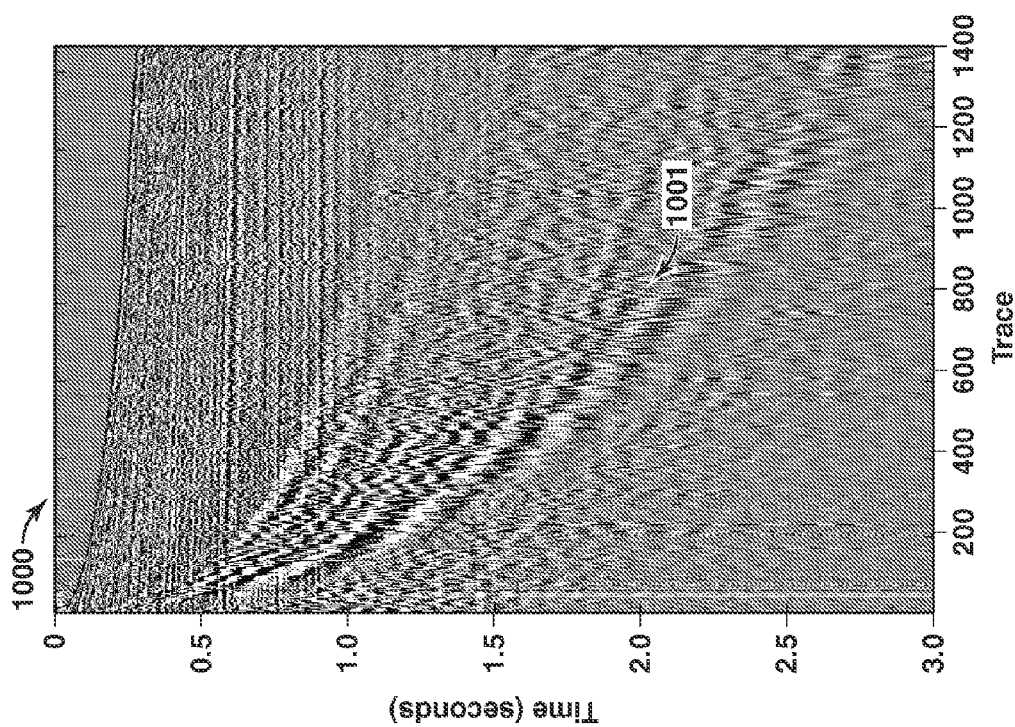
FIG. 10 depicts an example of the output of the process of FIG. 1 with surface waves mitigated.

FIG. 10 depicts an example 1000 of the output of block 108 of FIG. 1, namely the data with surface waves mitigated 109. FIG. 10 is derived from the conventional method of FIG. 1 using the filter of FIG. 8. In FIG. 10, surface waves remain in the data at the top of the mitigation window 1001, because surface wave dispersion was not completely removed and some of the dispersed surface wave fell outside the mitigation window. The mitigation window was kept narrow in order to minimize the effect of the windowing on the body wave data. Of course, better surface wave mitigation could be achieved by widening the window in the mitigation step in FIG. 10. However, this would include more body wave data in the mitigation window and degrade the body wave signal. Hence, the results suffer from the tradeoff of surface-wave mitigation for body wave degradation.

Figure 11:
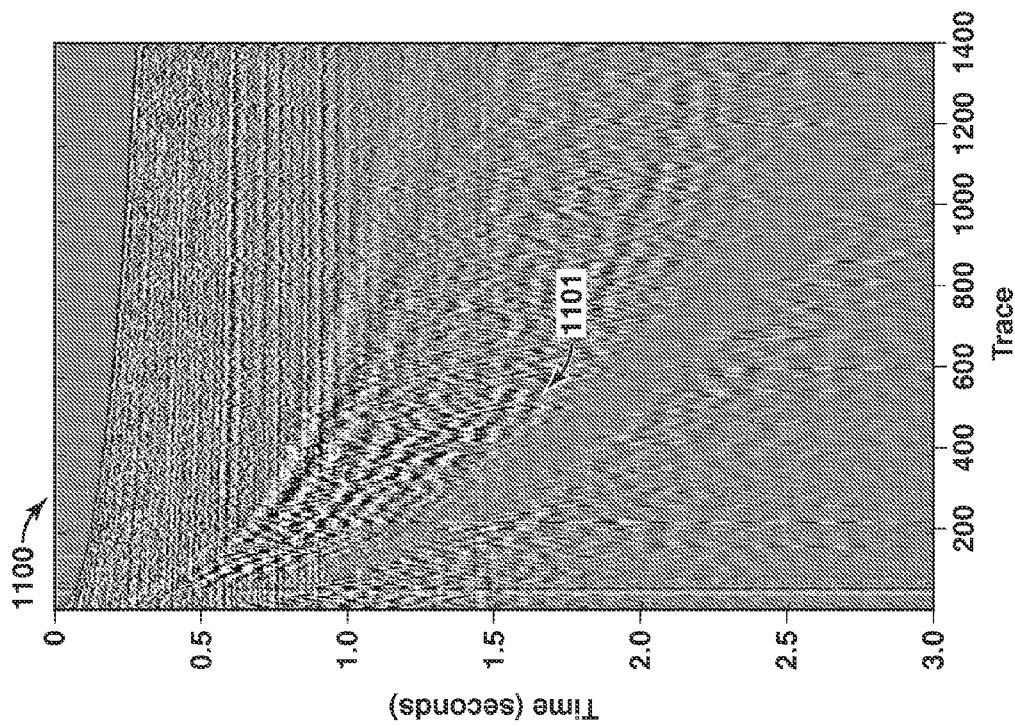
FIG. 11 depicts an example of the output of the process of FIG. 3 with surface waves mitigated, according to embodiments of the invention.

FIG. 11 depicts an example 1100 of the output 320 of block 319. In FIG. 11, surface waves have been removed or minimized in the data at the top of the mitigation window 1101, because surface wave dispersion and spatial variability of the waves has been accounted for in the process. Note that the mitigation window may be kept narrow in order to minimize the effect of the windowing on the body wave data. Since the process reduced or removed the surface waves, widening of the window is not needed. Thus, the tradeoff between surface-wave mitigation and body wave degradation that is present in the prior art is avoided in this process. Note that the vertical axis depicts time and the horizontal axis depicts trace numbers.

Mitigation in Spatially Inhomogeneous Media

Embodiments enable spatial variability of surface waves to be accounted for in dispersion correction, which yields superior surface wave noise mitigation with a reduced likelihood of attenuating the desirable signal.

Embodiments perform path integration of dispersion curves for surface waves, including a physically based bandwidth broadening technique, to prepare a phase conjugation operator for surface-wave noise mitigation. This operator may used as an input to several types of surface wave mitigation including: i) alignment, dispersion correction and horizontal filtering as described in U.S. Pat. No. 5,781,503 to Kim; ii) time-reversal backpropagation as described in the Berkhout reference, ibid.; and iii) focal transformation as described in A. J. Berkhout and D. J. Verschuur ("Focal transformation, an imaging concept for signal restoration and noise removal," 2006, Geophysics, 71, 6, pp. A55-A59, which is hereby incorporated herein by reference.

Embodiments recognize that surface-wave mitigation is fundamentally different from surface-wave identification in Earthquake seismology. Mitigation requires very accurate dispersion correction for techniques such as horizontal filtering or focal transformation to work well. Mitigation also requires spatially-varying dispersion curves in a frequency band that is sufficiently broad to cover the entire surface-wave spectrum. The automatic estimation of dispersion curves over a wide frequency band, however, often is practically impossible or yields erroneous estimates of dispersion curves at the low-amplitude edges of the band. Dispersion curves may be extrapolated in an ad hoc manner, which yields poor dispersion correction of the surface waves in the extrapolated frequency band. This is not critical in Earthquake seismology where the goal is the localization of seismic sources, since seismic sources still may be accurately localized using surface wave components within the well-estimated frequency band of a given dispersion curve. However, this poor extrapolation of some frequencies is extremely critical in noise mitigation, since the frequency components of the surface waves in the poorly extrapolated band result in complete misalignment or misfocusing, and therefore poor mitigation by subsequent filtering.

Spatial variability of surface waves can be accounted for in dispersion correction by modifying the phase term $\phi(r, f) = \hat{k}_r r$ in Eq. (1) to $$\varphi(r \mid r_s; f) = \hat{k}_r(r \mid r_s; f)l = \int_{r_s}^{r} \hat{k}_r(x, y, f)dl, \quad (2)$$

where $\hat{k}_r$ (x, y, f) is the local horizontal wavenumber as a function of spatial coordinate (x, y) and frequency f, and l is the distance from $r_s$ to r along the propagation path of the surface waves.

The phase term $\phi(r|r_s; f)$ in Eq. (2) then changes uniquely for a given source-receiver pair, and accounts for the variation of surface wave properties along the propagation path of the surface waves. This phase term now can be used in Eq. (2) for alignment of surface waves while accounting for spatial variation of surface-wave properties.

Equation (2) can also be expressed in terms of the phase velocity as $$\hat{v}_p(r \mid r_s; f) = l \left[ \int_{r_s}^{r} \hat{s}_p(x, y, f)dl \right]^{-1} = l \left[ \int_{r_s}^{r} \hat{v}_p^{-1}(x, y, f)dl \right]^{-1}, \quad (3)$$

where $\hat{v}_p(r \mid r_s; f) = 2\pi f / \hat{k}_r(r \mid r_s; f)$ and $\hat{s}_p(x, y, f) = \hat{v}_p^{-1}(x, y, f) = (2\pi f)^{-1}\hat{k}_r(x, y, f)$.

The propagation path can be assumed to be a straight line from the source to receiver if horizontal refraction of surface waves can be neglected, or it can also be calculated using frequency-by-frequency ray tracing in order to account for horizontal refraction of surface waves. Note that the phase term $\phi(r|r_s; f)$ can be calculated by wave equation modeling if ray theory is considered inadequate. Equation (3) assumes that different frequency components of surface waves propagate through different spatially varying media determined by $\hat{v}_p(x,y,f)$.

Embodiments use a technique where the phase term $\phi$ changes from trace to trace, and so it is identical to changing the region of noise removal in the f-k space from trace to trace. This ability to dynamically change the region of noise mitigation is derived from the fact that the noise on a given trace in the f-k space can be exactly calculated in a deterministic manner, using a priori knowledge of the local horizontal wavenumbers.

FIG. 12 depicts a process 1200 to mitigate surface waves according to embodiments of the invention. The process uses seismic survey records 1201 for a particular basin or region of interest. The seismic records may be created by firing a shot at or near the surface of the earth. A plurality of sensors located on or near the surface of the earth record the waves from the shot. The process also uses local dispersion curve estimates 1202 for the survey area. The estimates 1202 may be the results 203 of block 202 of FIG. 2, the results 306 of block 305 of FIG. 3, or the results 314 of block 313 of FIG. 3. However, any set of dispersion curve estimates for surface waves in the region of interest may be used. For example, the results 103 of block 102 of FIG. 1 may be used, where the local dispersion curves are estimated over a few sparse locations within the survey area, and then interpolated in space.

Figure 13:
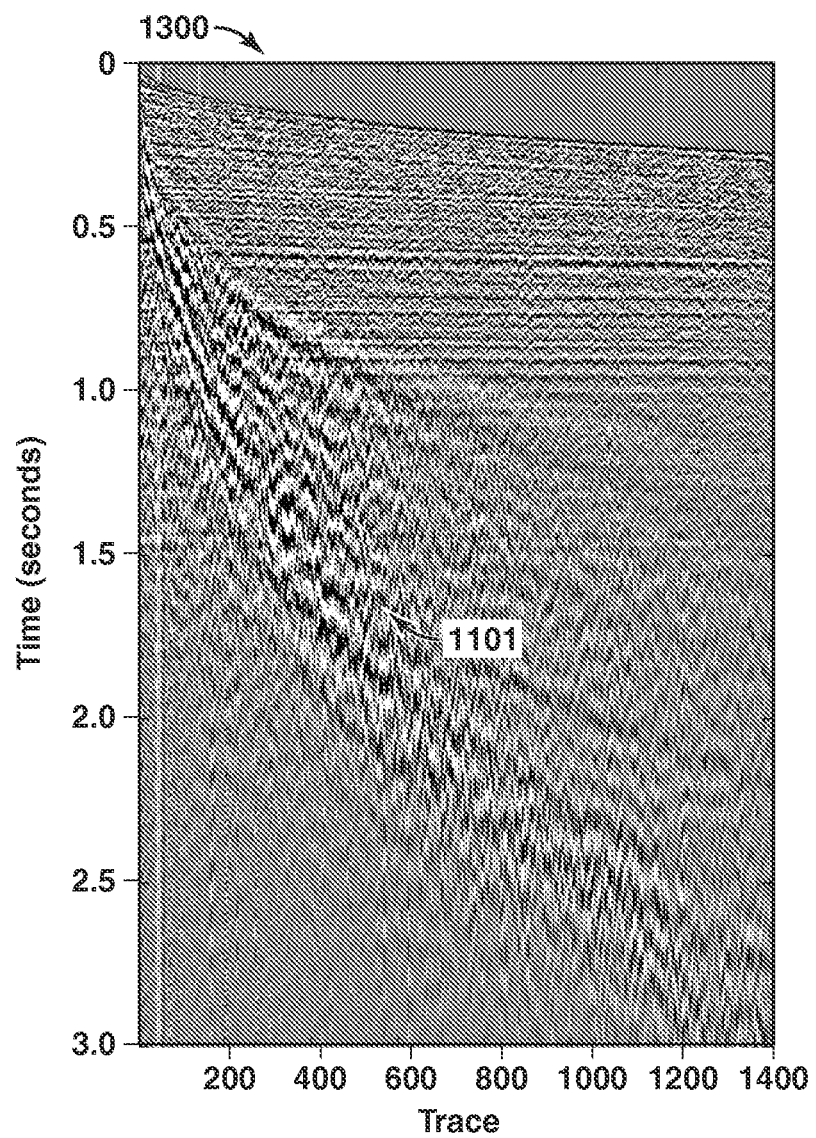
FIG. 13 depicts an example of seismic survey data containing surface wave noise.

FIG. 13 depicts an example of seismic survey data 1300 containing surface wave noise 1301. Seismic data 1300 would serve as data 1201 in the process 1200, and is the input data prior to surface-wave mitigation in FIGS. 10 and 11. FIGS. 14A and 14D depict examples of local dispersion curves 1401, 1402 of surface waves. The local dispersion curves $\hat{v}_p(x, y, f)$ are displayed at two frequencies for illustration, namely f=5 Hz and f=10 Hz, respectively. The curves 1401, 1402 would serve as curves 1202 for process 1200.

The process begins with block 1203 that extrapolates the local dispersion curve estimates over a sufficiently wide frequency band, which is typically 0-20 Hz in exploration seismic data, but may be different depending on the spectrum of the surface waves. This extrapolation step helps in mitigating surface waves if the estimated local dispersion curves do not span through the entire energetic frequency band of the surface waves. It is also needed if the local dispersion curves span through different frequency bands, since local dispersions curves need to be path-integrated in the frequency domain, following the block 1205 below. Extrapolation is performed such that the extrapolated phase velocities conform to the physical behavior of surface waves. In the low-frequency end, the dispersion curves are extrapolated so that (i) phase velocity is a monotonically decreasing function of frequency, (ii) group velocity is a monotonically decreasing function of frequency, and (iii) phase velocity equals group velocity when frequency f=0. In the high-frequency end, the dispersion curves are extrapolated so that (i) phase velocity is a monotonically decreasing function of frequency, (ii) group velocity is a monotonically increasing function of frequency, and (iii) phase velocity and group velocity asymptotically reach the same value as frequency goes to infinity. The output of this block 1203 is a set of broader band local dispersion curves 1204 that span the same frequency band as a function of space.

Figure 15A:
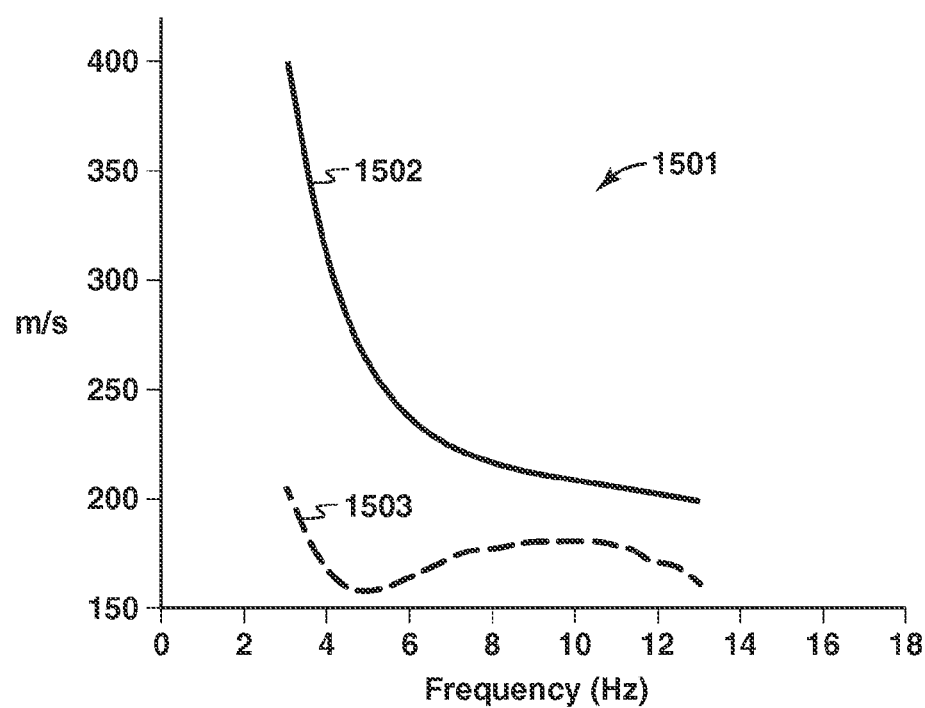
FIGS. 15A and 15B depict an example of the operation of block 1203 to extrapolate the curves in the frequency domain over sufficiently wide frequency band for surface-wave mitigation.
Figure 15B:
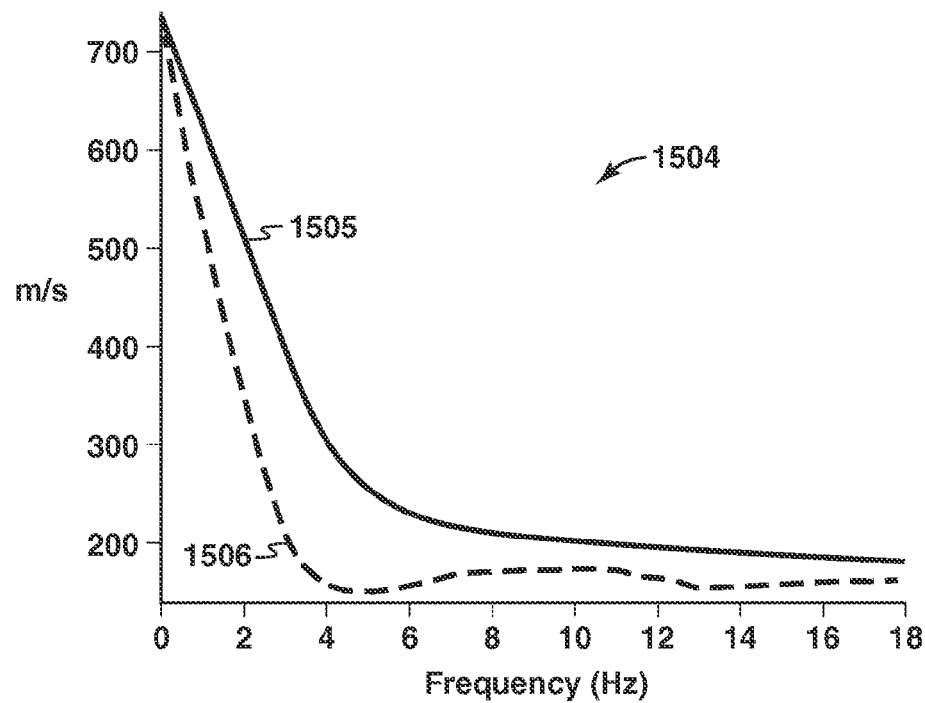

FIGS. 15A and 15B depict an example of the operation of block 1203 to extrapolate the curves in the frequency domain over a sufficiently wide frequency band for surface-wave mitigation. FIG. 15A depicts an exemplary input curve 1501 at one spatial location. The line 1502 is the input local phase velocity $\hat{v}_p(x, y, f)$ at one spatial location. The line 1503 is the local group velocity $\hat{v}_g(x, y, f)$ calculated using the input phase velocity $\hat{v}_g(x, y, f)$. FIG. 15B is the extrapolated version of FIG. 15A. The line 1505 is the extrapolated local phase velocity $\hat{v}_g(x, y, f)$ at the spatial location. The line 1506 is the extrapolated local group velocity $\hat{v}_p(x, y, f)$ calculated using the input phase velocity $\hat{v}_p(x, y, f)$.

Once the set of dispersion curves 1204 has been obtained as illustrated in FIGS. 15A and 15B, the process continues as shown in FIG. 12. For each frequency, the surface waves are treated as waves propagating through a 2-D spatially-varying medium defined by the local horizontal wave number $\hat{k}_r(x, y, f)$. The spatial variation of $\hat{k}_r(x, y, f)$ is examined to determine whether there may be strong horizontal refraction. This can be done, for example, by block 1205, where the process calculates the index of refraction of the 2-D medium and examines the spatial variation of the index of refraction. If the variation causes rays to bend such that accumulated phase error is more than a quarter of the wavelength, then the refraction is strong and should be accounted for during path integration.

For each shot-receiver pair, Eq. (2) is used to integrate the local horizontal wavenumber from the shot to receiver along the propagation path of the surface waves. If it was determined in block 1205 that the horizontal refraction might be non-negligible, the propagation path from the shot to receiver is modeled using 2-D ray tracing, or wave equation modeling is employed to directly calculate the phase term $\phi(r|r_s; f)$ in block 1206. 2-D ray tracing and wave equation modeling are exemplified by Virieus, J., Farra, V. and Madariaga, R., 1988, "Ray tracing in laterally heterogeneous media for earth quake location", J. Geophys, Res., 93, 6585-6599 (ray tracing), which is hereby incorporated herein by reference, and Kelly, K. R., Ward, R. W., Treitel, D., and Alford, R. M., 1976, "Synthetic seismograms: A finite-difference approach", Geophysics, 41, 2-27 (wave equation modeling), which is hereby incorporated herein by reference. Otherwise the propagation path is assumed to be a straight line from the source to receiver. The output of block 1206 is a phase term 1207 for each trace.

Figure 14B:
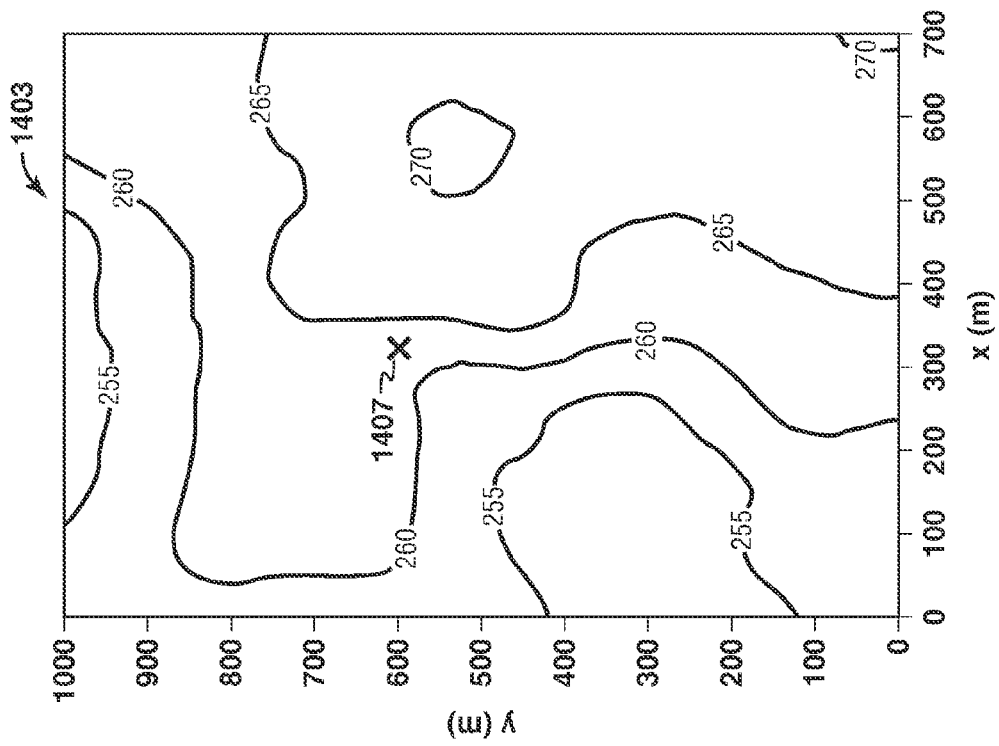
FIGS. 14A-14F depict examples of local dispersion curves and the results of process 1200.
Figure 14A:
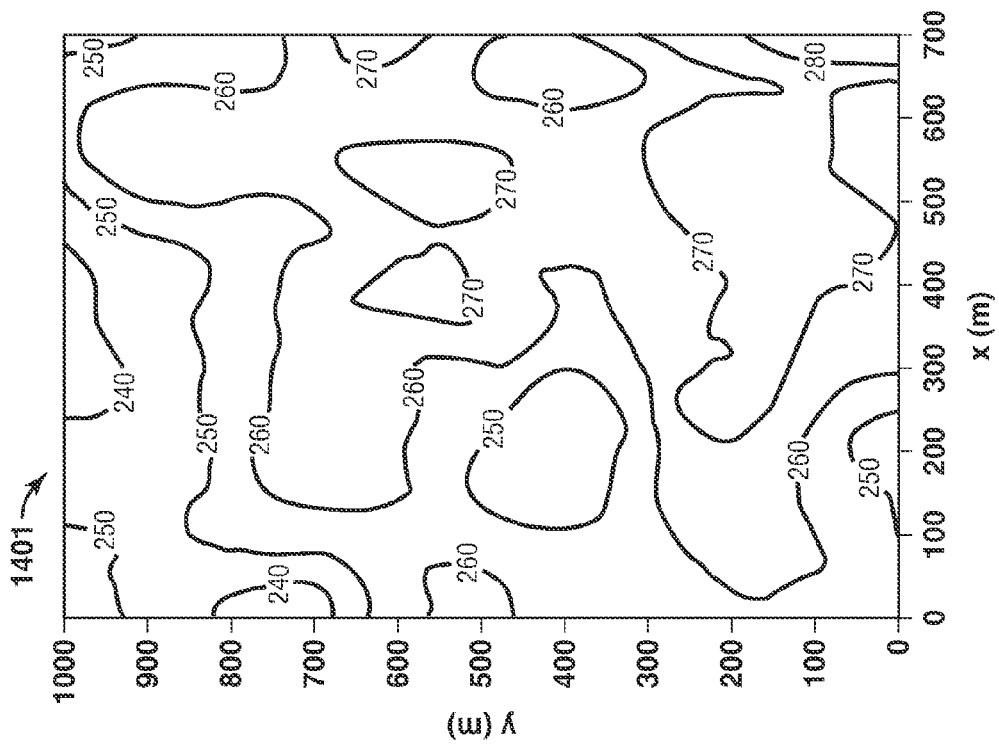
Figure 14D:
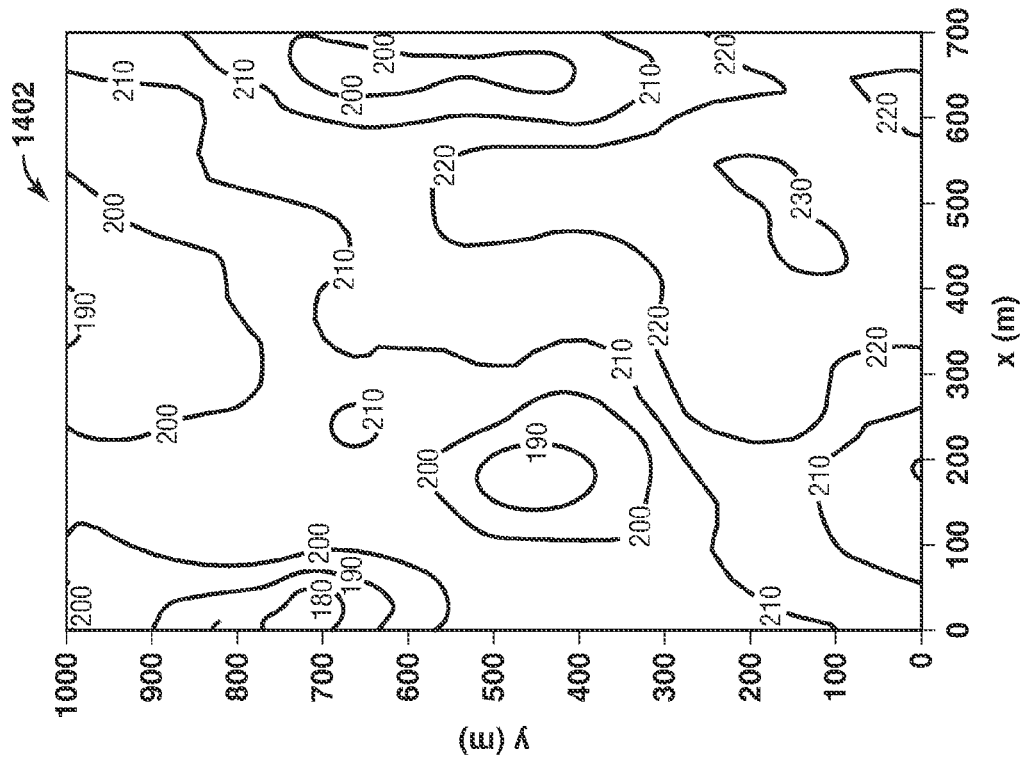
Figure 14C:
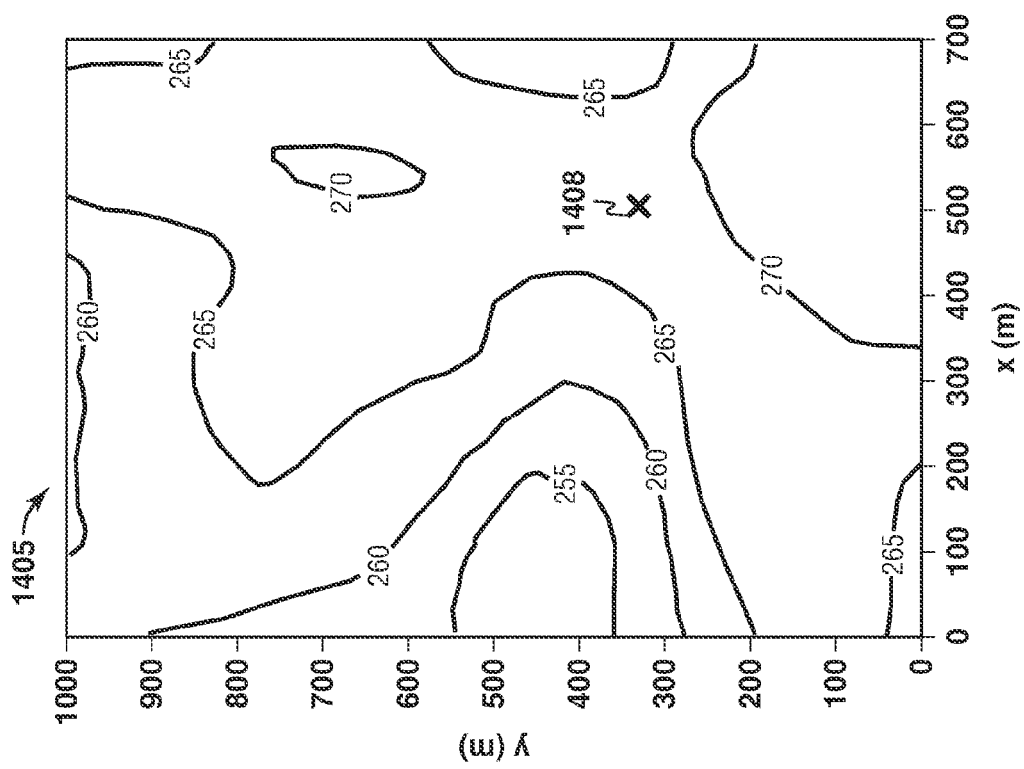
Figure 14F:
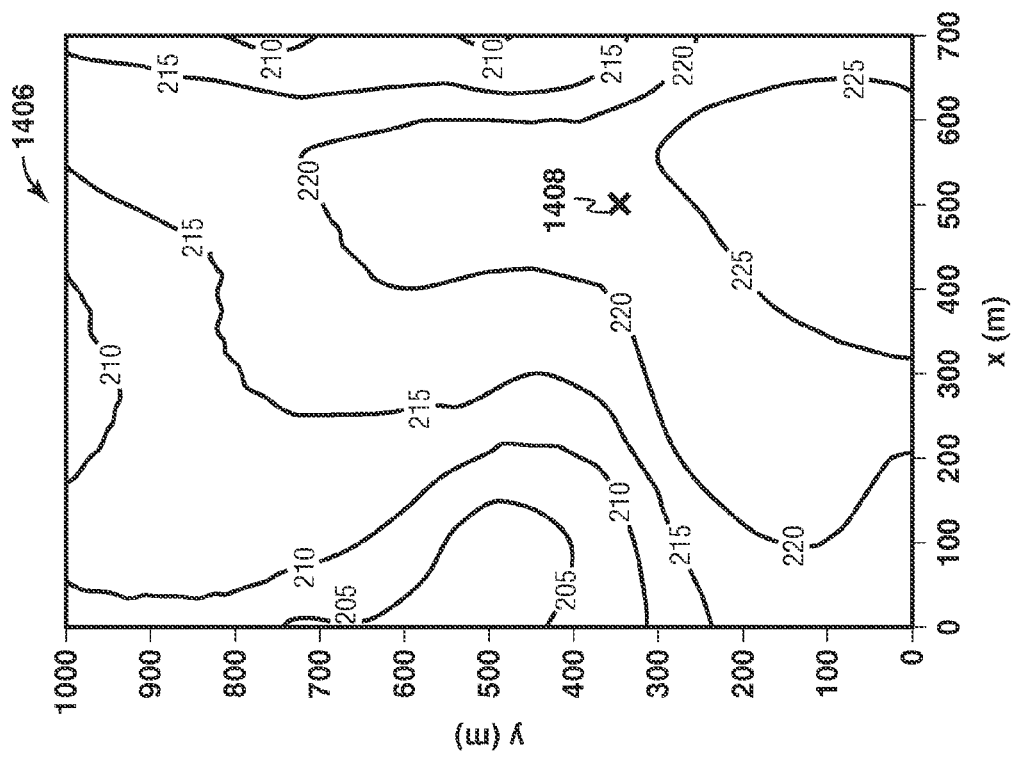
Figure 14E:
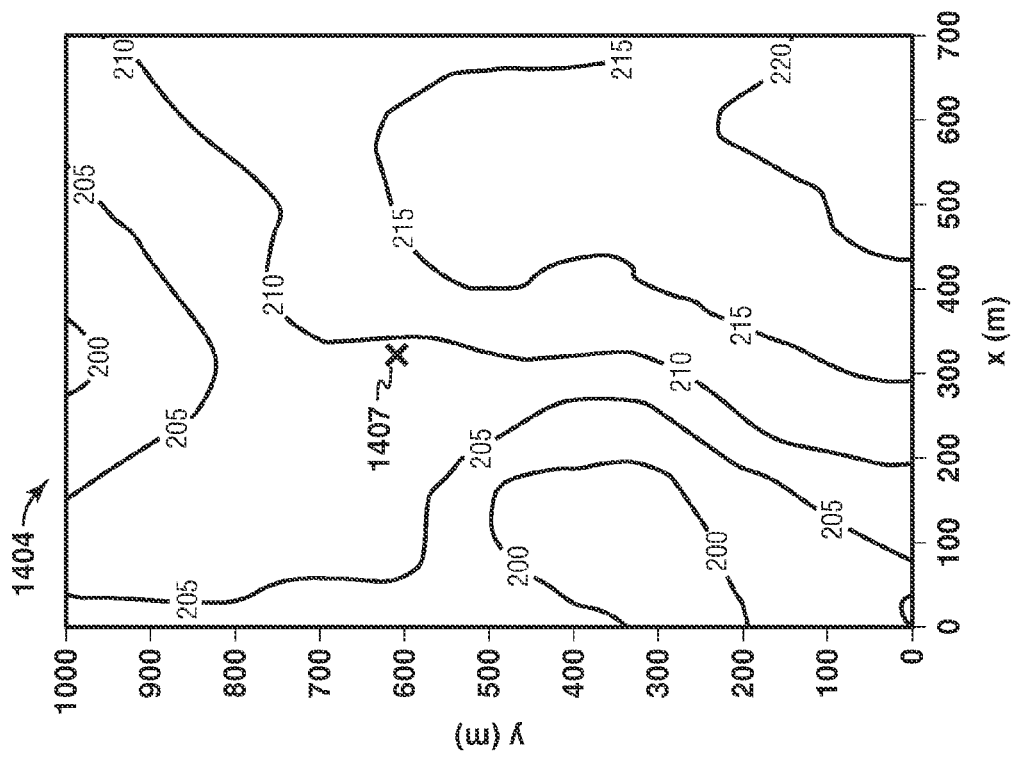

FIGS. 14B and 14C depict the path-integrated phase velocities $\hat{v}_p(r|r_s; f) = 2\pi f/\hat{k}_r(r|r_s; f)$ 1403, 1405 of the local phase velocities $\hat{v}_p(x,y,f)$ in FIG. 14A for two different shot locations 1407, 1408, each respectively marked by "x". Similarly, FIGS. 14E and 14F depict the path-integrated phase velocities $\hat{v}_p(r|r_s; f)$ 1404, 1406 of the local phase velocities $\hat{v}_p(x,y,f)$ in FIG. 14D for the same shots 1407, 1408 as in FIGS. 14B and 14C. In this example, the propagation path of the surface waves is assumed to be a straight line connecting the source and receiver. Note that in the comparison of FIGS. 14B and 14C the process 1200 dynamically changes dispersion curves depending both on the source and the receiver locations. A comparison of either FIGS. 14B and 14E, or FIGS. 14C and 14F shows that the process 1200 performs a frequency-by-frequency path-integral, and so it assumes that different frequency components of the surface waves propagate through different 2-D media. Note that each map of FIGS. 14B, 14C, 14E, and 14F depicts a representation of the phase velocity that would go into the computation of the phase term at each different receiver location for that given shot.

The phase term 1207 for each trace is now used in Eq. (1) via block 1208 to phase correct each trace within a trace gather by its unique phase correction. The phase-corrected data are processed for surface wave mitigation to eliminate surface-wave noise from seismic data in block 1208, resulting in data with surface waves mitigated, 1209.

Figure 16:
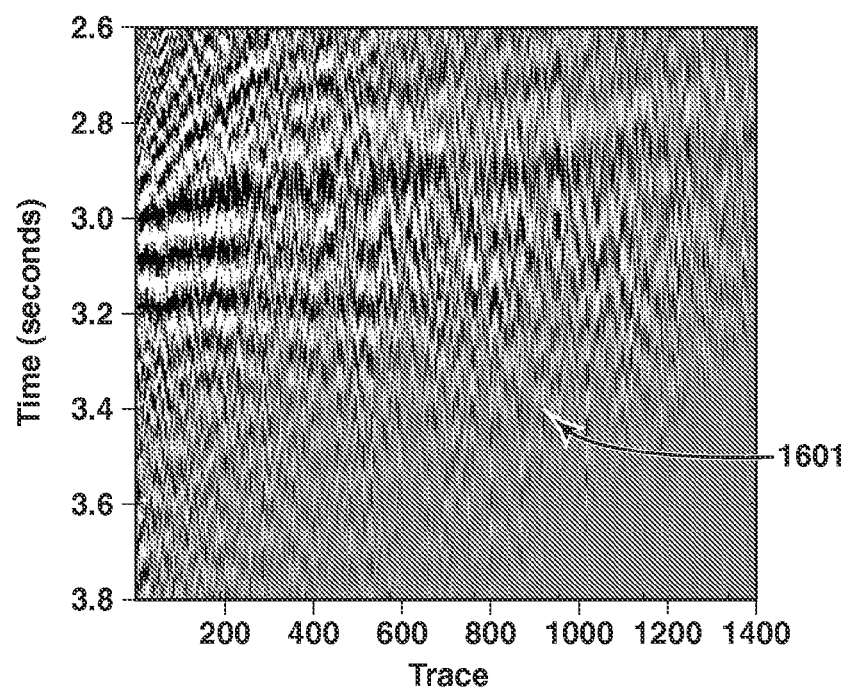
FIG. 16 depicts of an example of dispersion correction without using the process 1200.

FIG. 16 depicts an example of dispersion correction without using the process 1200. FIG. 16 depicts dispersion corrections or phase matching for the slowest-velocity surface-wave mode in the record. FIG. 16 is derived from the conventional method of FIG. 1 with a single reasonable dispersion curve for the entire record. Note region 1601 with poor flattening of the surface waves.

Figure 17:
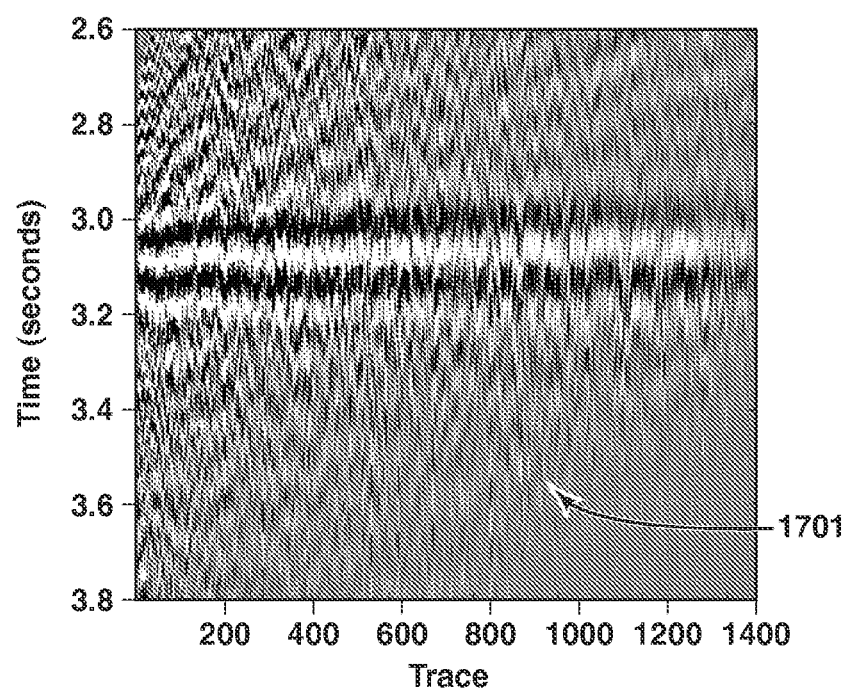
FIG. 17 depicts an example of dispersion correction using the operation of block 1208, according to embodiments of the invention

FIG. 17 depicts an example of the output 1209 of block 1207. FIG. 17 show dispersion corrections or phase matching for the slowest-velocity surface-wave mode in the record. FIG. 17 is derived using a unique dispersion correction term $\hat{\phi}(r|r_s; f)$ or phase term at each trace in the record. The phase term is used to align the waves as shown in FIG. 17. Note that FIG. 17 exhibits better flatness and a tighter more continuous wavelet trace-to-trace, e.g. region 1701, than does the surface wave in the record of FIG. 16. Thus, the distortion at 1701 can be windowed out of the signal without disturbing the upper portion of the graph.

Note that is it preferable to use straight raypaths in block 1205, which for most cases will be adequate. Also note that it is preferable to use the spatial low-pass filter method described in U.S. Pat. No. 5,781,503 to Y. C. Kim for mitigation correction in block 1208 or the methods described above with respect to blocks 206 of FIG. 2 and 319 of FIG. 3.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Figure 18:
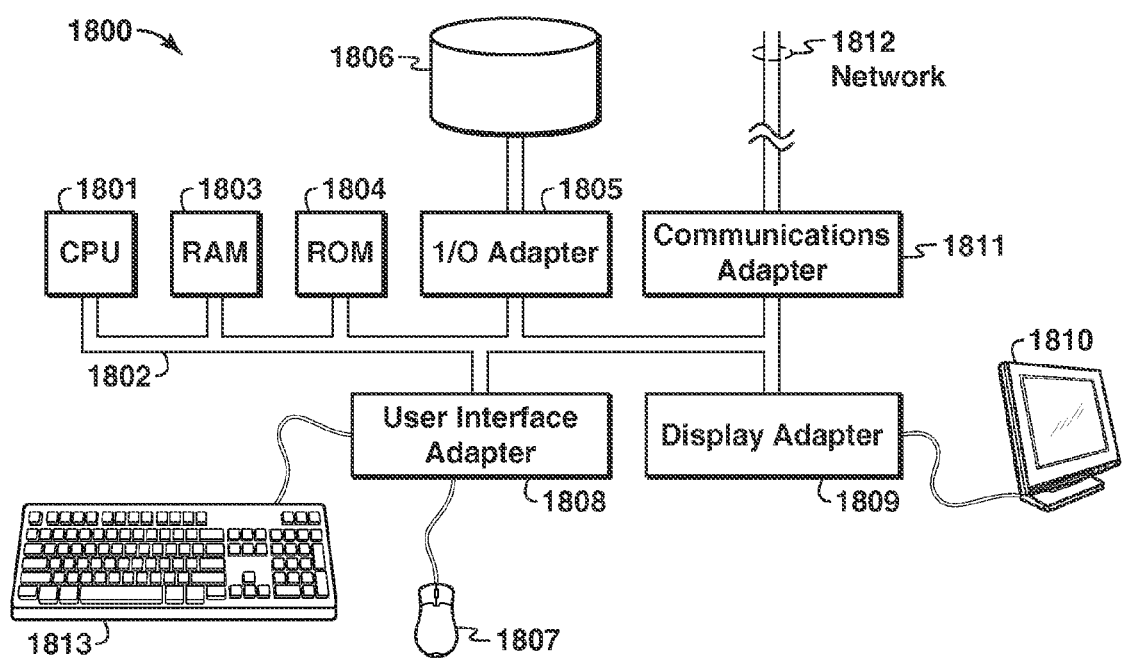
FIG. 18 depicts a block diagram of a computer system which is adapted to use the embodiments of the invention.

FIG. 18 illustrates computer system 1800 adapted to use the present invention. Central processing unit (CPU) 1801 is coupled to system bus 1802. The CPU 1801 may be any general purpose CPU, such as an HP PA-8500 or Intel Pentium processor or a cluster of many such CPUs as exemplified by modern high-performance computers. However, the present invention is not restricted by the architecture of CPU 1801 as long as CPU 1801 supports the inventive operations as described herein. Bus 1802 is coupled to random access memory (RAM) 1803, which may be SRAM, DRAM, or SDRAM. ROM 1804 is also coupled to bus 1802, which may be PROM, EPROM, or EEPROM. RAM 1803 and ROM 1804 hold user and system data and programs as is well known in the art.

Bus 1802 is also coupled to input/output (I/O) controller card 1805, communications adapter card 1811, user interface card 1808, and display card 1809. The I/O adapter card 1805 connects to storage devices 1806, such as one or more of a hard drive, a CD drive, a floppy disk drive, a tape drive, to the computer system. The I/O adapter 1805 is also connected to printer 1814, which would allow the system to print paper copies of information such as document, photographs, articles, etc. Note that the printer may be a printer (e.g. inkjet, laser, etc.), a fax machine, or a copier machine. Communications card 1811 is adapted to couple the computer system 1800 to a network 1812, which may be one or more of a telephone network, a local (LAN) and/or a wide-area (WAN) network, an Ethernet network, and/or the Internet network. User interface card 1808 couples user input devices, such as keyboard 1813, pointing device 1807, to the computer system 1800. The display card 1809 is driven by CPU 1801 to control the display on display device 1810.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of processing exploration seismic survey data of an inhomogeneous region, wherein the seismic survey data comprises body waves and surface waves from at least one source and at least one receiver, and the method comprising:
   receiving seismic survey data from at least one sensor;
   forming a plurality of local dispersion curves from the survey data, at different (x,y) locations, thereby providing surface wave velocity as a function of (x,y) location and frequency;
   extrapolating the dispersion curves to a broader frequency band;
   integrating the extrapolated dispersion curves along a path from the source to the receiver to form path-integration curves;
   forming a filter using the path-integration curves; and
   applying the filter to the seismic data to remove at least a portion of the surface waves from the seismic survey data.

2. The method of claim 1, wherein the forming a plurality of local dispersion curves comprises:
   characterizing a spatial variability of properties of the surface waves in the seismic survey data;
   determining whether the region can be subdivided into a plurality of sub-regions based on the characterization, wherein the spatial variability is relatively constant within each sub-region;
   if the determining is affirmative, estimating at least one local dispersion curve for each sub-region;
   if the determining is negative, forming at least one dispersion curve for each location in the region; and
   using the dispersion curves from one of the estimating and the forming, extrapolating the dispersion curves over a frequency band.

3. The method of claim 2, wherein the spatially varying property is at least one of a phase and group velocity of the surface waves.

4. The method of claim 1, wherein the region comprises a plurality of locations, and the forming a plurality of local dispersion curves comprises:
   analyzing at least one surface wave property for each location in the region; and
   estimating at least one local dispersion curve for the surface wave property for locations in the region.

5. The method of claim 4, wherein the surface wave property is a group velocity of the surface waves.

6. The method of claim 1, wherein the region comprises a plurality of locations, and the seismic data is a sparse data set, and the forming of a plurality of local dispersion curves comprises:
   analyzing at least one surface wave property using the sparse data set for one location in the region;

forming a dispersion curve from the analyzed data; and
interpolating the dispersion curve into a plurality of dispersion curves for the region.

7. The method of claim 1, wherein the extrapolating is performed such that phase velocities conform to a physical behavior of the surface waves.

8. The method of claim 7, wherein the extrapolating the dispersion curves comprises:
   extrapolating a lower frequency curve such that a phase velocity of the curve monotonically decreases as a function of frequency, group velocity of the curve monotonically decreases as a function of frequency, and phase velocity equals group velocity when frequency equals zero; and
   extrapolating a higher frequency curve such that a phase velocity of the curve monotonically decreases as a function of frequency, group velocity of the curve monotonically increases as a function of frequency, and phase velocity approaches the same value as group velocity when frequency increases toward infinity.

9. The method of claim 1, further comprising:
   calculating an index of refraction along the path;
   determining whether horizontal refraction affects surface waves along the path.

10. The method of claim 9, further comprising:
    if the determination is affirmative, modeling the path for the integration; and
    if the determination is negative, use a straight line between the source and the receiver as the path for the integration.

11. The method of claim 10, wherein modeling comprises at least one of:
    two dimensional ray tracing, and wave equation modeling.

12. The method of claim 1, wherein integrating the extrapolated dispersion curves results in at least one phase term, and the forming a filter uses the phase term to form the filter.

13. The method of claim 1, wherein applying comprises at least one of:
    mitigating surfaces waves using dispersion correction and horizontal filtering;
    mitigating surface waves using time-reversal backpropagation; and
    mitigating surface waves using focal transformation.

14. The method of claim 1, further comprising:
    organizing the seismic survey data into a gather of traces;
    wherein the gather is one of a common-shot type, a common-receiver type, and a super-shot type.

15. The method of claim 1, further comprising:
    using the seismic survey data having the portion of surface waves removed to determine whether there is an underground deposit of hydrocarbons in the region.

16. The method of claim 1, wherein the filter is formed by steps comprising:
    obtaining a phase correction term from the path-integration dispersion curves; and
    phase matching the surface waves in the seismic data using the phase correction term.

17. The method of claim 16, wherein the integration is operable for each frequency.

18. The method of claim 16, wherein the integration is operable for each mode of a plurality of modes of the surface waves.

19. The method of claim 16, wherein the at least one source and at least one receiver comprise one source and a plurality of receivers.

20. The method of claim 16, wherein the at least one source and at least one receiver comprise a plurality of sources and one receiver.

21. The method of claim 16, further comprising:
    extrapolating the dispersion curves to a broader frequency band with constraints on at least one of phase velocities and group velocities of the surface waves.

22. The method of claim 16, further comprising:
    mitigating the surface waves using the phase correction term.

23. The method of claim 22, wherein mitigating comprises:
    mitigating the surface waves by windowing of the phase matched surface waves.

24. The method of claim 22, wherein mitigating comprises:
    mitigating the surface waves by using a spatial filtering of the surface wave involving the phase terms.

25. The method of claim 24, wherein mitigating comprise at least one of:
    mitigating surfaces waves using dispersion correction and horizontal filtering;
    mitigating surface waves using time-reversal backpropagation; and
    mitigating surface waves using focal transformation.

* * * * *